(12) United States Patent
Nakayama

(10) Patent No.: US 8,240,640 B2
(45) Date of Patent: Aug. 14, 2012

(54) CONTACTOR

(75) Inventor: Takashi Nakayama, Kanagawa (JP)

(73) Assignee: JGC Corporation, Tokyo (JP)

( * ) Notice: Subject to any disclaimer, the term of this patent is extended or adjusted under 35 U.S.C. 154(b) by 335 days.

(21) Appl. No.: 12/673,441

(22) PCT Filed: Aug. 13, 2008

(86) PCT No.: PCT/JP2008/064766
§ 371 (c)(1),
(2), (4) Date: Feb. 12, 2010

(87) PCT Pub. No.: WO2009/022753
PCT Pub. Date: Feb. 19, 2009

(65) Prior Publication Data
US 2011/0210457 A1   Sep. 1, 2011

(30) Foreign Application Priority Data

Aug. 16, 2007 (JP) .................................. 2007-212394
May 29, 2008 (JP) .................................. 2008-141520
Jul. 10, 2008 (JP) .................................. 2008-180562

(51) Int. Cl.
*B01F 3/04* (2006.01)

(52) U.S. Cl. ...... 261/109; 261/110; 261/113; 261/114.1
(58) Field of Classification Search .................. 261/108, 261/109, 110, 113, 114.1, 114.4, 114.5
See application file for complete search history.

(56) References Cited

U.S. PATENT DOCUMENTS

| 169,970 | A | * | 11/1875 | Deymann et al. | 261/114.1 |
| 732,548 | A | | 6/1903 | Guillaume | |
| 960,223 | A | * | 5/1910 | Guillaume | 261/110 |
| 3,730,690 | A | * | 5/1973 | McCarthy et al. | 422/256 |

(Continued)

FOREIGN PATENT DOCUMENTS

DE   39 37 671   5/1991

(Continued)

OTHER PUBLICATIONS

Russian Office Action mailed Apr. 8, 2011, directed to counterpart Russian Application No. 2010109748/05(013696); 14 pages.

(Continued)

*Primary Examiner* — Charles Bushey
(74) *Attorney, Agent, or Firm* — Morrison & Foerster LLP

(57) ABSTRACT

[Technical Problem] A contactor is provided which is capable of making fluids of two phases contact each other under a good dispersion state and which can be easily multi-staged. [Means for Solving the Problems] The inside of a contactor 1 is divided into a plurality of cells 22, 32 by partition walls (a vertical wall 10, horizontal walls 21, 31) and the respective cells 22, 32 become countercurrent contacting spaces of an upflow fluid flowing up in the contactor 1 and a downflow fluid flowing down in the contactor 1. A downflow fluid injection hole 52 provided in the vertical wall 10 of each stage makes the downflow fluid blocked by the partition wall and residing inject into the neighboring cells 22, 32 of a lower stage side, while an upflow fluid flow-in port 51 provided in an upper side of the injection hole 2 makes an upflow fluid from the cells 22, 32 of the lower stage side flow in.

22 Claims, 27 Drawing Sheets

U.S. PATENT DOCUMENTS

| | | | | |
|---|---|---|---|---|
| 4,230,533 A * | 10/1980 | Giroux | ........................... | 203/1 |
| 4,496,430 A * | 1/1985 | Jenkins | ..................... | 202/158 |
| 4,543,219 A | 9/1985 | Yamato et al. | | |
| 4,582,569 A * | 4/1986 | Jenkins | ..................... | 202/158 |
| 4,826,574 A | 5/1989 | Gourlia et al. | | |
| 5,393,429 A | 2/1995 | Nakayama et al. | | |
| 5,500,116 A * | 3/1996 | Nakayama et al. | ........... | 210/511 |
| 6,645,350 B1 * | 11/2003 | Steacy | ..................... | 202/158 |
| 7,270,316 B2 * | 9/2007 | Burch | ..................... | 261/114.1 |
| 7,527,249 B2 * | 5/2009 | Dubettier-Grenier et al. | .. | 261/96 |
| 2003/0183957 A1 * | 10/2003 | Zarabi | ..................... | 261/114.4 |

FOREIGN PATENT DOCUMENTS

| | | |
|---|---|---|
| EP | 0 635 293 | 1/1995 |
| GB | 2 130 499 | 6/1984 |
| JP | 59-95903 | 6/1984 |
| JP | 62-193602 | 8/1987 |
| JP | 7-80283 | 3/1995 |
| JP | 2000-254402 | 9/2000 |
| JP | 2001-293330 | 10/2001 |
| JP | 2002-336657 | 11/2002 |
| RU | 2 104 732 | 2/1998 |
| WO | WO-98/51389 | 11/1998 |
| WO | WO-2004/009567 | 1/2004 |

OTHER PUBLICATIONS

International Search Report and Written Opinion mailed on Dec. 2, 2008 directed at application No. PCT/JP2008/064766; 9 pages.

Australian Office Action dated Oct. 6, 2010, directed to Australian Application No. 2008287772; 2 pages.

Chilean Office Action dated Nov. 25, 2010, directed to Chilean Application No. 2403-2008; 1 page.

Canadian Office Action dated Jun. 9, 2011, directed to Canadian Application No. 2,695,181; 2 pages.

Search Report and Written Opinion mailed Jun. 15, 2011, directed to Singapore Application No. 201000966-0; 10 pages.

Chilean Office Action dated Jul. 27, 2011, directed to Chilean Application No. 2403-2008; 2 pages.

Korean Office Action mailed Nov. 24, 2011, directed to Korean Application No. 10-2010-7003231; 9 pages.

* cited by examiner (A3 SURFACE)

(B3 SURFACE)

(A4 SURFACE)

(B4 SURFACE)

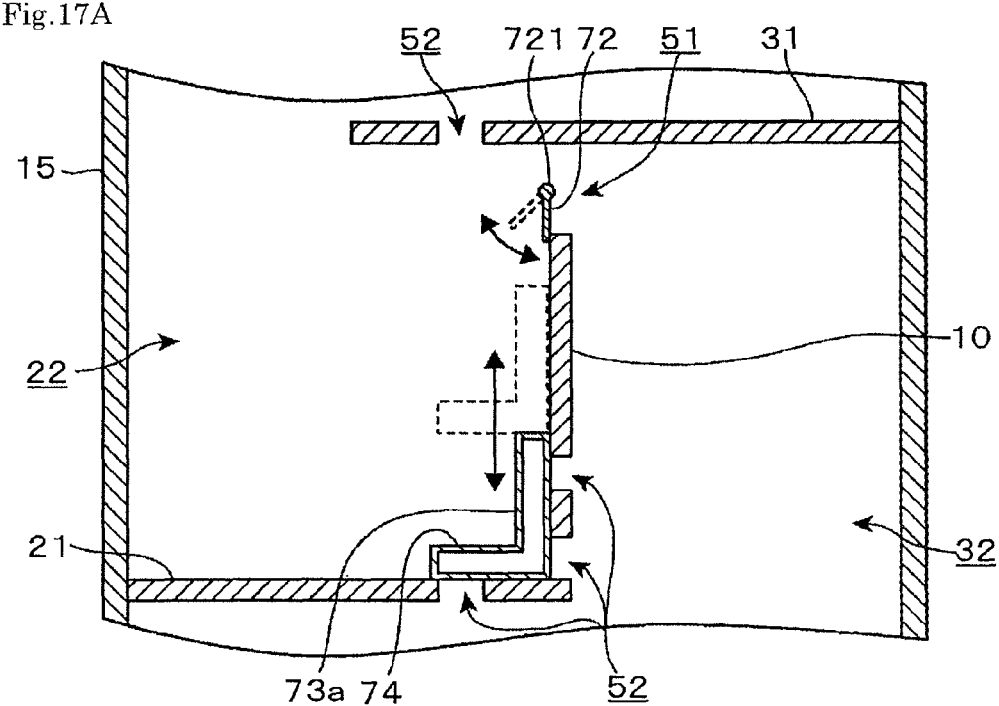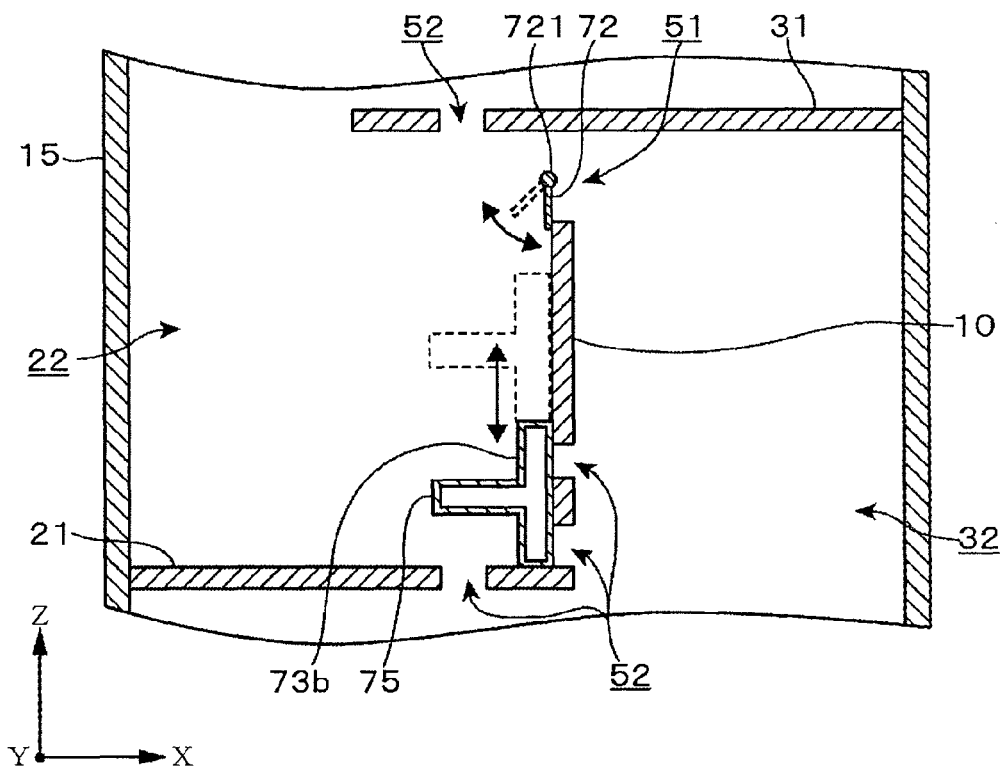

Fig.21
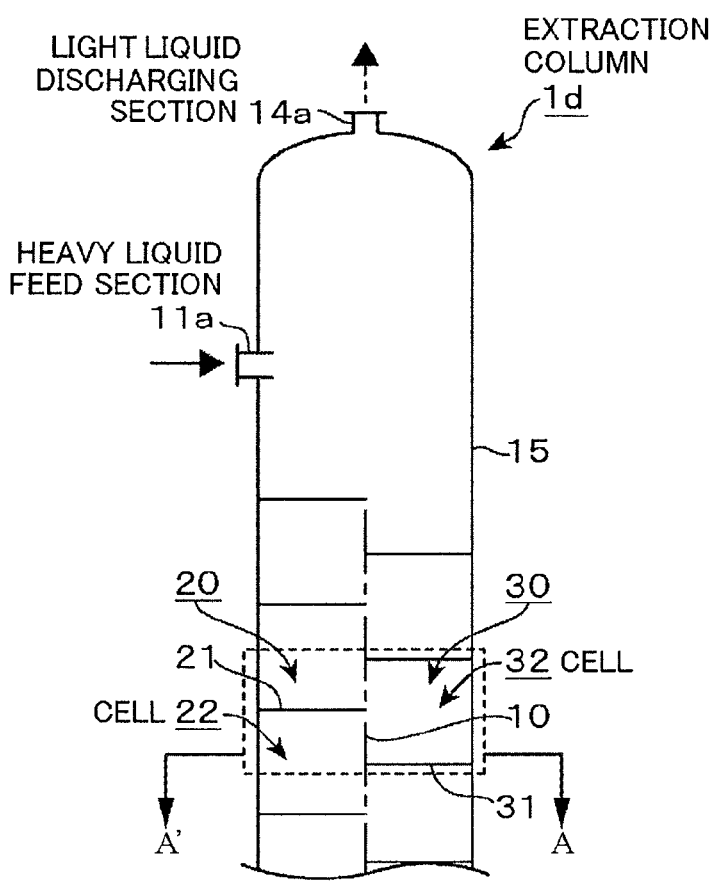
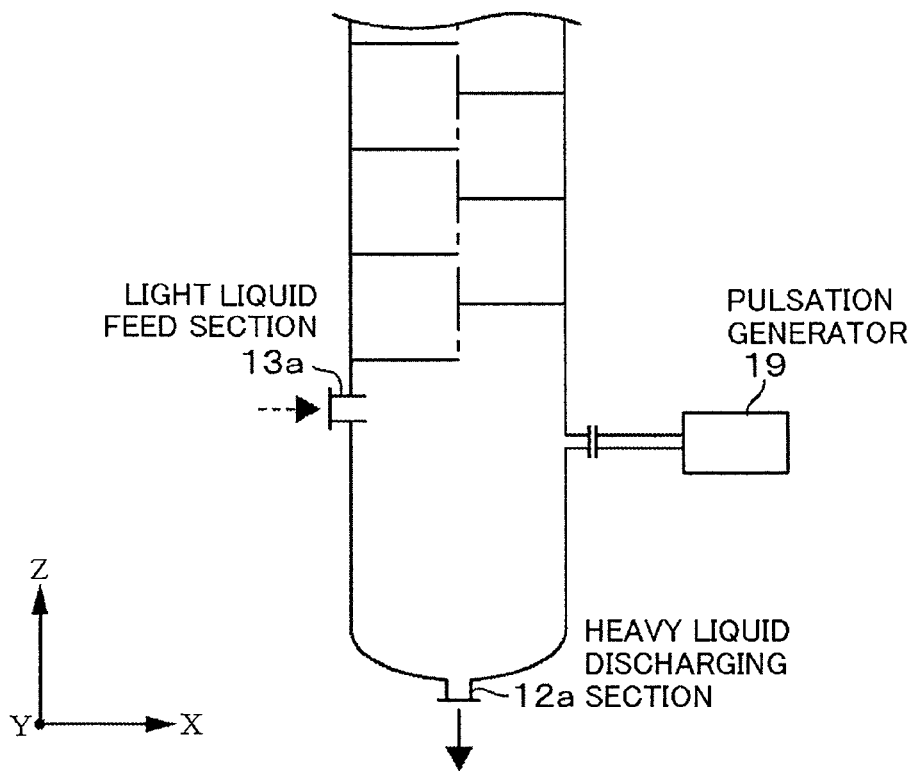

CONTACTOR

REFERENCE TO RELATED APPLICATIONS

This application is a national stage application under 35 USC 371 of International Application No. PCT/JP2008/064766, filed Aug. 13, 2008, which claims priority from Japanese Patent Application Nos. 2007-212394, filed Aug. 16, 2007, 2008-141520, filed May 29, 2008, and 2008-180562, filed Jul. 10, 2008, the contents of which prior applications are incorporated herein by reference.

FIELD OF THE INVENTION

The present invention relates to a contactor to perform gas-liquid contacting such as absorption, stripping and distillation, liquid-liquid contacting such as extraction, and gas-liquid-solid contacting such as catalytic reaction of a liquid including a solid body such as slurry and a gas.

BACKGROUND OF THE INVENTION

In industries such as oil refinery, gas purification and petrochemistry, there are adopted many processes such as absorption, stripping, distillation, extraction, and catalytic reaction, in which separation, purification and conversion of a specific substance is performed by, for example, making a gas and a liquid contact each other or making two kinds of liquids contact each other to use giving and receiving of a substance or energy which is progressing between these fluids, a reaction between substances and the like. For example, contactors such as an absorption column, a stripping column or an extraction column in which two fluids in different phases are made to contact each other in the column to progress mass transfer on an interface between the fluids, and a distillation column in which temperature gradient is given in a direction of a height of the column and separation and purification of a substance is performed by using vapor-liquid equilibrium are equipments broadly adopted in those processes.

Generally, the contactor is provided with a mechanism to enhance efficiency of mass transfer by dispersing two fluids very well into each other to make a contact area large, and various types of contactors are used in correspondence with a fluid which is dealt with or a process applied. From such a view point, among major types of gas-liquid contactors, for example, are (1) a spray column or a jet scrubber in which a liquid is fed into the column in a liquid drop state by using a pressure pump and the like and the liquid drops are dispersed into a gas phase, a bubble column in which bubbles are dispersed into the column filled with a liquid phase, (2) a packed column in which a liquid is made to flow in a liquid film state on a surface of a packed object packed in the column to make a gas-liquid contacting interface large, (3) a tray column in which trays making a liquid flowing down in the column temporarily reside thereon are disposed at a predetermined interval and bubbles are dispersed into a liquid phase residing on the tray through a bubblecap or a hole provided in each tray, and so on.

Among those gas-liquid contactors, the types such as the spray column and the bubble column, in which the liquid drops or bubbles are dispersed into the gas phase or liquid phase respectively, has an advantage that a dispersion state of the gas and the liquid is good compared with that of the packed column and the like, but a time period of gas-liquid contacting is comparatively short and the theoretical stage number in the whole column is equivalent to only one or two. Therefore, in order to obtain a high absorption efficiency or stripping efficiency in, for example, the absorption column or stripping column, a special equipment constitution such as making an equipment multi-staged by connecting a plurality of contactors in series, and there is a problem from a viewpoint of complication of the equipment or cost increase.

In contrast, in the packed column or the tray column, a theoretical stage number of the contactor can be designed comparatively freely by increasing/decreasing a packed height of the packed object or an actual tray number. However, considering a mechanism of gas-liquid contacting, contacting of the gas and the liquid is mainly performed on a surface of the liquid film or on a bubble surface in the liquid phase and it cannot be said that the liquid is in a well dispersed state in the gas phase, so that further improvement has been studied. Besides, in the tray column, since a contacting mechanism in which bubbles are dispersed into the liquid phase is adopted, there is a problem that a foaming phenomenon, that is, foaming of the liquid phase reducing a throughput or processing efficiency, narrows an operational range (an amount of a gas/liquid fed or a feeding proportion, kinds of processable fluid) of the contactor.

Here, in Patent Document 1, there is described a technology in which, as shown in FIG. 26A, in a gas-liquid contactor 100 of a tray column type, gas-liquid contacting is performed while a liquid flowing down and a gas flowing up in the column are made to flow parallelly on a surface of a tray 101 without a hole. However, an object of the present technology is to develop a compact contactor which can be disposed indoors, for example, and is not objected to further enhance a dispersion state of a gas and a liquid.

In Patent Document 2, there is described a technology in which, in a gas-liquid catalytic reaction column 110 of a packed column type, as shown in FIG. 26B, by dividing the inside of the gas-liquid catalytic reaction column 110 into a plurality of cells 111 in which a hydrophobic catalyst is packed, drift of a liquid flow due to usage of a hydrophobic catalysis is prevented. Further, there is described a technology in which, as shown in FIG. 26C, by forming a wall surface of each cell 111 into a waveform rippling in a direction (a horizontal direction) crossing a direction (a vertical direction) of a liquid flow and a gas flow to form the liquid flow depending on the waveform, a contact area of the gas flow and the liquid flow is made large. The present technology has a constitution similar to that of an embodiment of the present invention described later in that the inside of the column is divided into a plurality of cells, but in the mechanism of gas-liquid contacting, a gas and a liquid is made to contact each other on a surface of the liquid flowing down the wall surface of the cell 111, and nothing is described about a technology to disperse a liquid in a gas phase.

Further, as an example of liquid-liquid contacting, the present inventor has developed a liquid-liquid contactor 120 in which, as shown in FIG. 27, a plurality of trays 121 are provided in the liquid-liquid contactor 120 for making a heavy liquid (H) that flows down and a light liquid (L) that flows up contact each other, part of the tray 121 being cut out to make a flow path 123 for the heavy liquid and the light liquid, and a weir plate 122 extending vertically downwards from an end part of the flow path 123 side of each tray 121 is provided (Patent Document 3). This weir plate 122 is provided with an opening 124, and a light liquid ($L_3$) blocked by the weir plate 122 and temporarily residing below the tray 121 flows out in a jet state in a horizontal direction ($L_1$) via the opening 124, and is dispersed into the heavy liquid (H) by becoming liquid drops ($L_2$) by a shear stress from the heavy liquid (H) flowing down, whereby both the liquids can be effectively made to contact each other. For such a technology, the present inventor also proceeds with development of a technology to further improve a dispersion state of heavy and light liquids in the liquid-liquid contactor.

[Patent Document 1]
Japanese Patent Application Laid-open No. 2002-336657: claim 1, paragraph 0010, FIG. 1
[Patent Document 2]
Japanese Patent Application Laid-open No. 2000-254402: paragraphs 0015 to 0020, FIG. 1, FIG. 4
[Patent Document 3]
Japanese Patent Application Laid-open No. Hei 7-80283: paragraphs 0017 to 0019, paragraph 0032, FIG. 5

SUMMARY OF THE INVENTION

The present invention is made under such circumstances, and its object is to provide a contactor capable of making fluids of two phases contact each other under a good dispersion state and which can be easily multi-staged.

According to the present invention, a contactor in which an upflow fluid being a gas is fed from a lower part in a column and a downflow fluid being a liquid is fed from an upper part of the column and the gas and the liquid are subjected to countercurrent contacting includes:

providing a plurality of stages of cells in a manner that the upper stage side cell and the lower stage side cell neighboring each other along flow paths of the upflow fluid and the downflow fluid are on different stages, the cell forming a countercurrent contacting space of the upflow fluid and the downflow fluid;

separating the upper stage side cell and the lower stage side cell by a partition wall; and providing, in the partition wall of the respective stages, a downflow fluid injection hole in a lower part of the upper stage side cell so that the downflow fluid blocked by the partition wall and residing injects into the lower stage side cell, and providing an upflow fluid flow-in port in an upper side than a region in which the downflow fluid resides, through the upflow fluid flow-in port the upflow fluid from the lower stage side cell flowing into the upper stage side cell.

According to another invention, a contactor in which an upflow fluid being a liquid is fed from a lower part in a column and a downflow fluid being a liquid is fed from an upper part of the column and the liquid and the liquid are subjected to countercurrent contacting includes:

providing a plurality of stages of cells in a manner that the upper stage side cell and the lower stage side cell neighboring each other along flow paths of the upflow fluid and the downflow fluid are on different stages, the cell forming a countercurrent contacting space of the upflow fluid and the downflow fluid;

separating the upper stage side cell and the lower stage side cell by a partition wall; and providing, in the partition wall of the respective stages, a downflow fluid injection hole in a lower part of the upper stage side cell so that the downflow fluid residing in the upper stage side cell injects by its potential energy into the lower stage side cell, and providing an upflow fluid flow-in port in an upper side than the downflow fluid injection hole, through the upflow fluid flow-in port the upflow fluid from the lower stage side cell flowing by its buoyancy into the upper stage side cell.

According to yet another invention, a contactor in which an upflow fluid being a liquid is fed from a lower part in a column and a downflow fluid being a liquid is fed from an upper part of the column and the liquid and the liquid are subjected to countercurrent contacting includes:

providing a plurality of stages of cells in a manner that the upper stage side cell and the lower stage side cell neighboring each other along flow paths of the upflow fluid and the downflow fluid are on different stages, the cell forming a countercurrent contacting space of the upflow fluid and the downflow fluid;

separating the upper stage side cell and the lower stage side cell by a partition wall; and providing, in the partition wall of the respective stages, an upflow fluid injection hole in an upper part of the lower stage side cell so that the upflow fluid residing in the lower stage side cell injects by its buoyancy into the upper stage side cell, and providing in a lower side than the upflow fluid injection hole a downflow fluid flow-in port through which the downflow fluid from the upper stage side cell flows by its potential energy into the lower stage side cell.

In each contactor described above having the downflow fluid injection hole, it may be constituted that the upper stage side cell and the lower stage side cell are in a positional relationship in which parts thereof are stacked above and below each other and that the injection hole of the downflow fluid is provided in at least one of a lower side surface and a bottom surface of the upper stage side cell, while in the contactor having the upflow fluid injection hole, the upper stage side cell and the lower stage side cell may be in a positional relationship in which parts thereof are stacked above and below each other, and the injection hole of the upflow fluid may be provided at least one of an upper side surface and a ceiling surface of the lower stage side cell. It is preferable that the injection hole of the downflow fluid, the injection hole of the upflow fluid, an upflow fluid flow-in port or downflow fluid flow-in port is constituted with a slit extending in a lateral direction or a longitudinal direction or numeral hole sections arranged in the lateral direction or the longitudinal direction Further, in the contactor in which the gas is the upflow fluid and the liquid is the downflow fluid, it is possible to provide the downflow fluid injection hole with a first shutter opening and closing in correspondence with an amount of the downflow fluid blocked by the partition wall, in order to prevent the upflow fluid flowing in the lower stage side cell from flowing into the upper stage side cell via the downflow fluid injection hole. On this occasion, the first shutter can be provided in a flow-out side of the downflow fluid injection hole in a manner to be closed by being biased by a first biasing means, and can be constituted to be opened against a bias of the first biasing means by a pressure, that is, a hydraulic pressure, from the downflow fluid residing in the upper stage side cell.

Further, in the contactor in which the gas is the upflow fluid and the liquid is the downflow fluid, in a case that the downflow fluid injection hole is provided in a side surface of the cell, the first shutter can be constituted to move up and down between a down position to close the downflow fluid injection hole and an up position to open the downflow fluid injection hole and can be constituted to move up from the down position by buoyancy of the downflow fluid residing in the upper stage side cell. Further, on this occasion, in a case that the downflow fluid injection hole is provided in a bottom surface of the cell, the first shutter can be constituted to close the downflow fluid injection hole of the bottom surface at the down position. Further, the first shutter moving up and down by the buoyancy of the downflow fluid can have a buoyancy compensator protruding in a lateral direction toward the upper stage side cell.

In addition, in the contactor in which the gas is the upflow fluid and the liquid is the downflow fluid it is possible that the upflow fluid flow-in port is provided with a second shutter opening and closing a part of the upflow fluid flow-in port in correspondence with a pressure of the upflow fluid flowing from the lower stage side cell into the upper stage side cell. In this case, there can be considered a constitution in which the second shutter is provided in a flow-out side of the upflow fluid flow-in port in a manner to be closed by being biased by a second biasing means and is opened against a bias of the second biasing means by a pressure from the upflow fluid, and so on The bottom surface of the cell may be sloped to be lower toward the injection hole provided to the cell, and this is suitable for a case that the downflow fluid is slurry and the like including a granular material.

Further, it is also possible that a plurality of cell lines in which the numerous cells are disposed in longitudinally one line are disposed, the cell belonging to each cell line and the cell of the cell line neighboring that cell line are disposed to be on different stages, the respective cell lines are arranged laterally along one direction, and the respective cells are arranged concentrically laterally in the contactor formed to have a cylindrical shape.

A contactor according to the present invention have numerous stages of cells forming countercurrent contacting spaces of an upflow fluid (a gas or a liquid) and a downflow fluid (a liquid), in each of these cells, and the downflow fluid injected from the upper stage side cell via an injection hole and the upflow fluid flew from the lower stage side cell via a flow-in port are subjected to countercurrent contacting, so that a good dispersion state can be created in each cell. As a result, in a case of a gas-liquid contactor, for example, it is possible to enhance absorption efficiency of an absorption operation or stripping efficiency of a stripping operation.

Further, since these contacting spaces can be formed easily only by separating the inside of a column by a partition wall, it is possible to easily multi-stage the column, so that it becomes possible to construct a sophisticated contactor at a low cost.

BRIEF DESCRIPTION OF DRAWINGS

FIG. 17A and FIG. 17B are longitudinal cross-sectional views of cells according to second and third modification examples of the first shutter;

FIG. 21 is a longitudinal cross-sectional view showing a constitutional example of an extraction column to which the liquid-liquid contactor according to the second embodiment described above is applied;

DETAILED DESCRIPTION OF THE INVENTION

Figure 1:
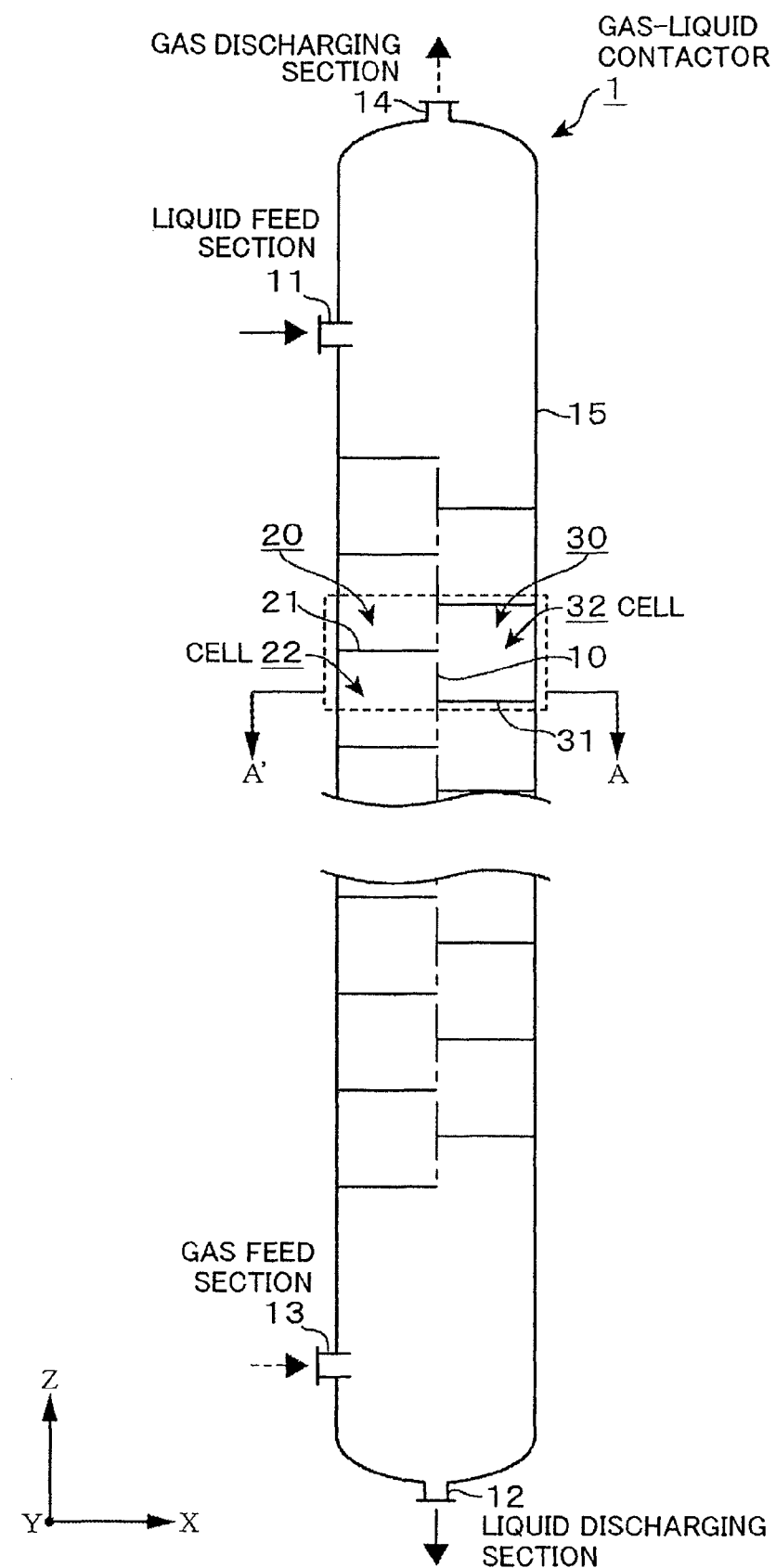
FIG. 1 is a longitudinal cross-sectional view showing a structure of an entire gas-liquid contactor according to an embodiment of the invention.
Figure 2:
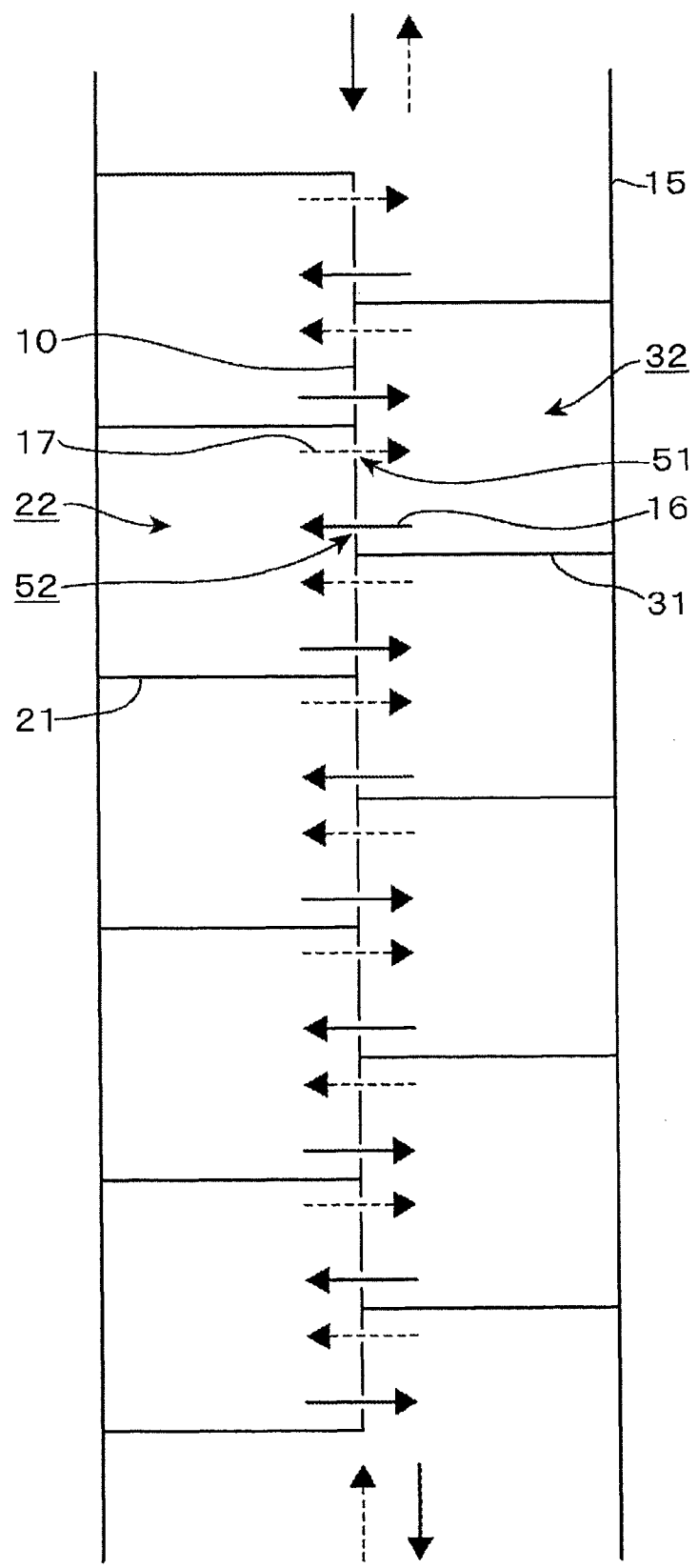
FIG. 2 is an explanatory view schematically showing directions in which a gas and a liquid flow in the gas-liquid contactor.
Figure 3A:
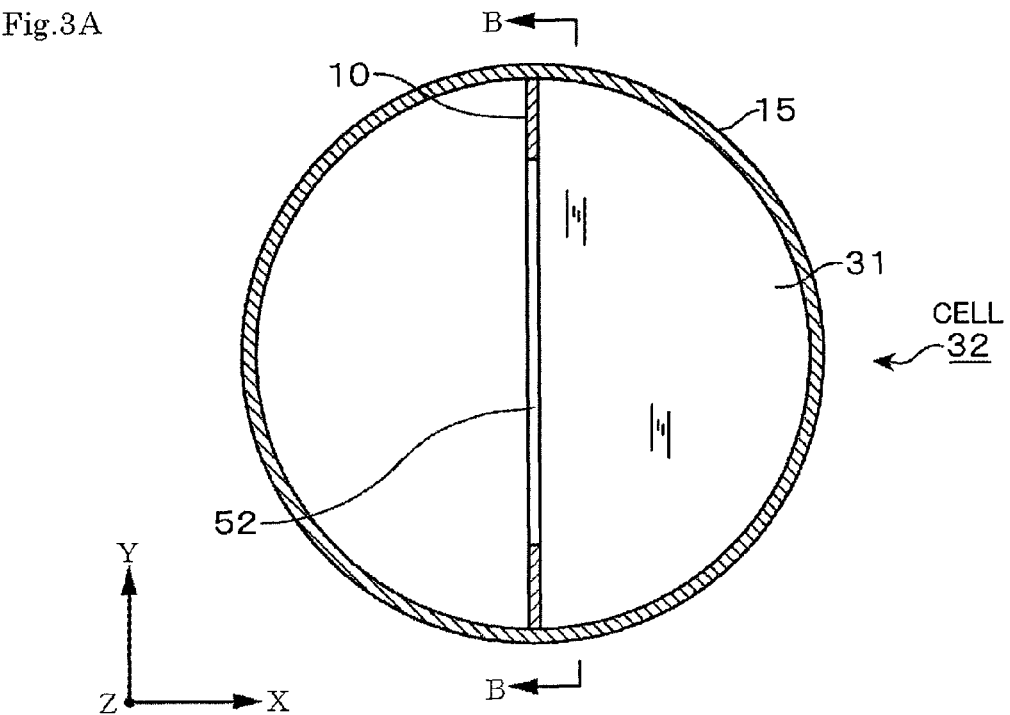
FIG. 3A and FIG. 3B are explanatory views showing a structure of a contacting space in the gas-liquid contactor.
Figure 3B:
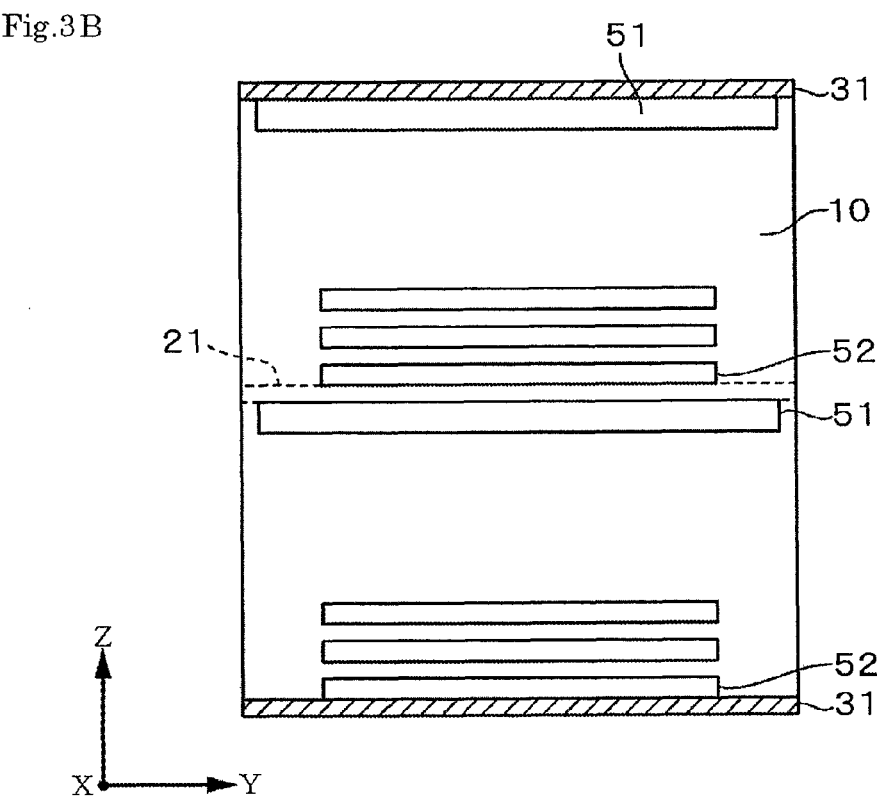
Figure 4:
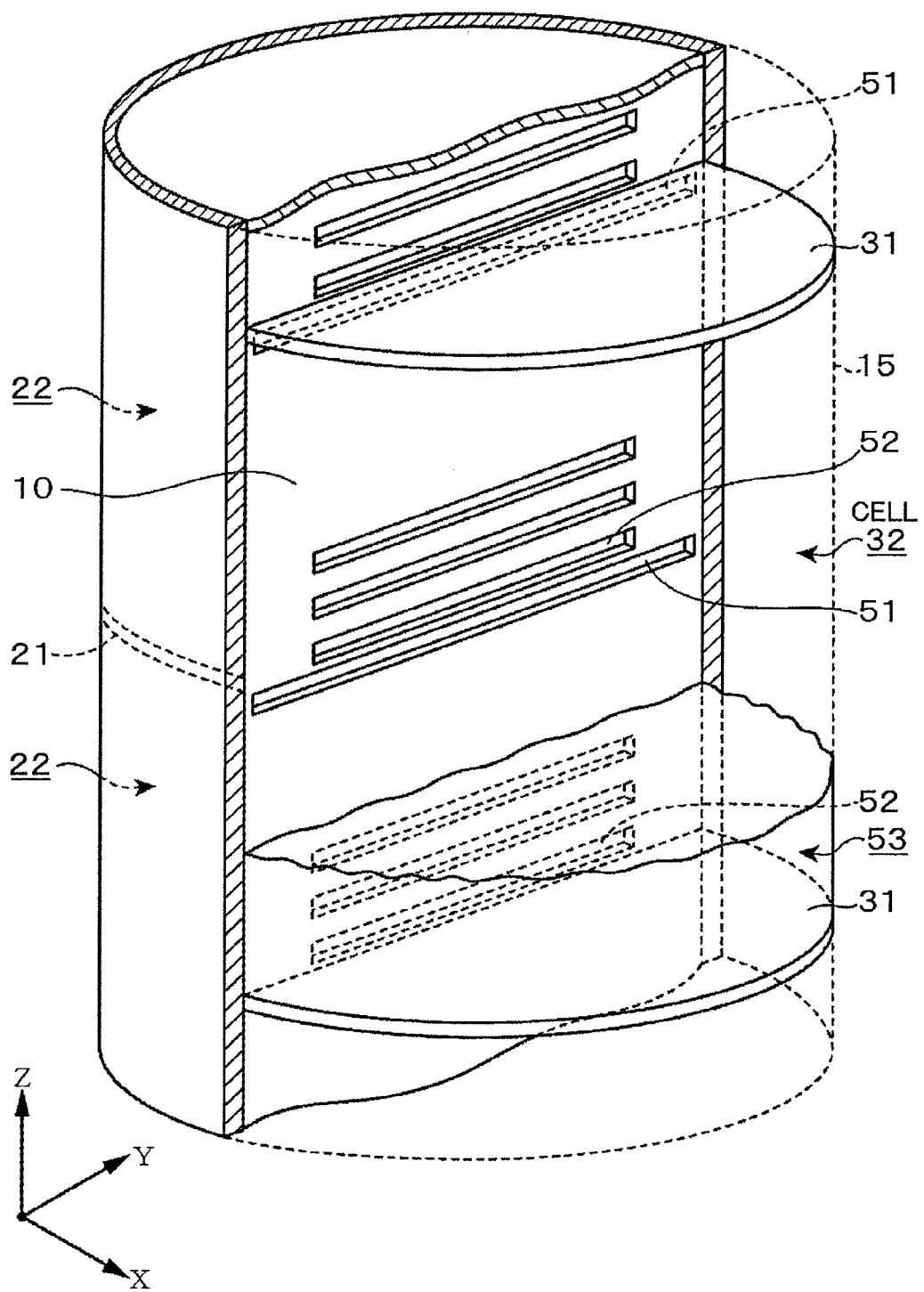
FIG. 4 is a perspective view showing a structure of the contacting space.

As an embodiment according to the present invention, a gas-liquid contactor 1 performing gas-liquid contacting such as absorption or stripping is taken as an example, and its structure is described using FIG. 1 to FIG. 4. FIG. 1 and FIG. 2 are longitudinal cross-sectional views schematically showing an overall structure of the gas-liquid contactor 1 according to the present embodiment, while FIG. 3A, FIG. 3B and FIG. 4 are explanatory views for an internal structure thereof.

The gas-liquid contactor 1 is constituted with a cylindrical container made of, for example, stainless steel, plays a role of subjecting a gas (an upflow fluid) flowing up in this gas-liquid contactor and a liquid (a downflow fluid) flowing down in the gas-liquid contactor to countercurrent contacting with each other. As shown in FIG. 1, a column top portion of the gas-liquid contactor is provided with a liquid feed section 11 to feed a liquid to the inside of the gas-liquid contactor 1 and a gas discharging section 14 to discharge a gas, while a column bottom portion is provided with a liquid discharging section 12 to discharge the liquid and a gas feed section 13 to feed the gas.

As shown in FIG. 1, in a gas-liquid contacting region between the liquid feed section 11 and the gas feed section 13 in the gas-liquid contactor 1, there is provided a vertical wall 10 extending vertically at a diametrical position of a circle drawn by an inner peripheral surface of the gas-liquid contactor 1 in a manner to divide a main body of the gas-liquid contactor 1 into two portions, right and left of FIG. 1.

In a left side region 20 of the gas-liquid contactor 1 divided by the vertical wall 10, there are provided a plurality of horizontal walls 21 at an equal interval, whereby a space of the left side region 20 is divided into a plurality of spaces in a longitudinal direction. On the other hand, in a right side region 30 divided by the vertical wall 10, there are provided a plurality of horizontal walls 31 at an equal interval on different stages in relation to the horizontal walls 21, whereby a space of the right side region 30 is divided into a plurality of spaces in the longitudinal direction. It should be noted that the horizontal wall 31 of the right side region 30 is positioned at a height level of the middle of the horizontal walls 21 longitudinally neighboring in the left side region 20.

Therefore, when a space surrounded by the two horizontal walls 21, 21 (31, 31) longitudinally neighboring each other, a column wall 15 of the gas-liquid contactor 1 and the vertical wall 10 is called a cell, there are formed, in the gas-liquid contactor 1, two cell lines in each of which those cells are longitudinally disposed on a plurality of stages, and the cells belonging to one of the cell lines are disposed to be on different stages in relation to the cells belonging to the other cell lines. It should be noted that in the following description, reference numerals 22, 32 are respectively allotted to the cell of the left side region 20 and to the cell of the right side region 30.

These cells 22, 32 constitute countercurrent contacting spaces of the gas and the liquid flowing in the gas-liquid contactor 1. The respective cells 22, 32 in the gas-liquid contactor have constitutions similar to each other, and hereinafter, the cell 32 shown in a broken line in FIG. 1, for example, is taken as an example for explanation. FIG. 3A is a plan view (viewed from A-A surface of FIG. 1) of the horizontal wall 31 of a bottom surface side of the cell 32, while FIG. 3B is a side surface view (viewed from B-B surface of FIG. 3A) of the vertical wall 10 of the cell 32. FIG. 4 is a perspective view showing an internal structure of the cell 32 in the gas-liquid contactor 1.

As shown in FIG. 3B, in the vertical wall 10, at positions immediately below the respective horizontal walls 21, 31, there are formed gas flow openings 51 made of slits extending in a horizontal direction, while at positions immediately above the respective horizontal walls 21, 31 in the vertical wall 10, there are formed liquid flow openings 52 extending in the horizontal direction and made of, for example, three-tire slits. Lower surfaces of the respective horizontal walls 21, 31 and upper peripheral edges of the slits of the gas flow openings 51 are common, while a height position of the lowest slit of the three-tier slit constituting the liquid flow opening 52 is designed to become lower than a liquid surface of a liquid pool at a time that an operation of the gas-liquid contactor 1 becomes in a steady state is as will be described below.

By the above constitution, as shown in the perspective view of FIG. 4, for example, when the vertical wall 10 is viewed from a certain cell 32, the gas flow opening 51 and the liquid flow opening 52 in an upper half side are respectively equivalent to a gas flow-out port from which the gas being the upflow fluid flows out to the cell 22 in a diagonally upper stage (previous stage) side and equivalent to a liquid flow-in port to which the liquid being the downflow fluid is flown from the cell 22 in the diagonally upper stage side. Similarly, the gas flow opening 51 and the liquid flow opening 52 in a lower half side are respectively equivalent to a gas flow-in port from which the gas is flown from the cell 22 in a diagonally lower stage (next stage) side and to a liquid flow-out port from which the liquid flows out to the cell 22 in the diagonally lower stage side.

In other words, the liquid flow-out port provided to the cell 22 in the diagonally upper stage side of the cell 32 shown in FIG. 4 is equivalent to the liquid flow-in port of the cell 32, while the gas flow-out port provided to the cell 22 diagonally lower stage side is equivalent to the gas flow-in port of the cell 32. As stated above, by the gas flow openings 51 and the liquid flow openings 52 provided in the respective cells 22, 32, a flow path in which a gas flows up and a flow path in which a liquid flows down are formed in the gas-liquid contactor 1 as shown in FIG. 2. It should be noted that an arrow illustrated by a broken line in FIG. 2 indicates a gas flow 17 while an arrow illustrated by a solid line indicates a liquid flow 16.

Here, the liquid flow opening 52 is constituted as a narrow flow path of a slit shape as described above, whereby this liquid flow opening 52 functions as a resistor when the liquid having flowing into the cell 32 flows out to the cell 22 of the diagonally lower stage side, as shown in FIG. 4. As a result, spaces of the lower sides in the respective cells 22, 32 become residence sections 53 blocking and retaining the liquid flowing in the cells 22, 32 by the vertical wall 10, and the liquid flowing in the cells 22, 32 is sent to the cells 32, 22 of the lower stage side via the liquid flow opening 52 after forming a liquid pool in the residence section 53. A depth (a liquid depth) of the liquid pool residing in the residence section 53 is determined by a flow amount of the liquid fed by a liquid feed section 1, and the larger the flow amount is, the deeper the liquid depth is while the smaller the flow amount is, the shallower the liquid depth is.

Figure 5:
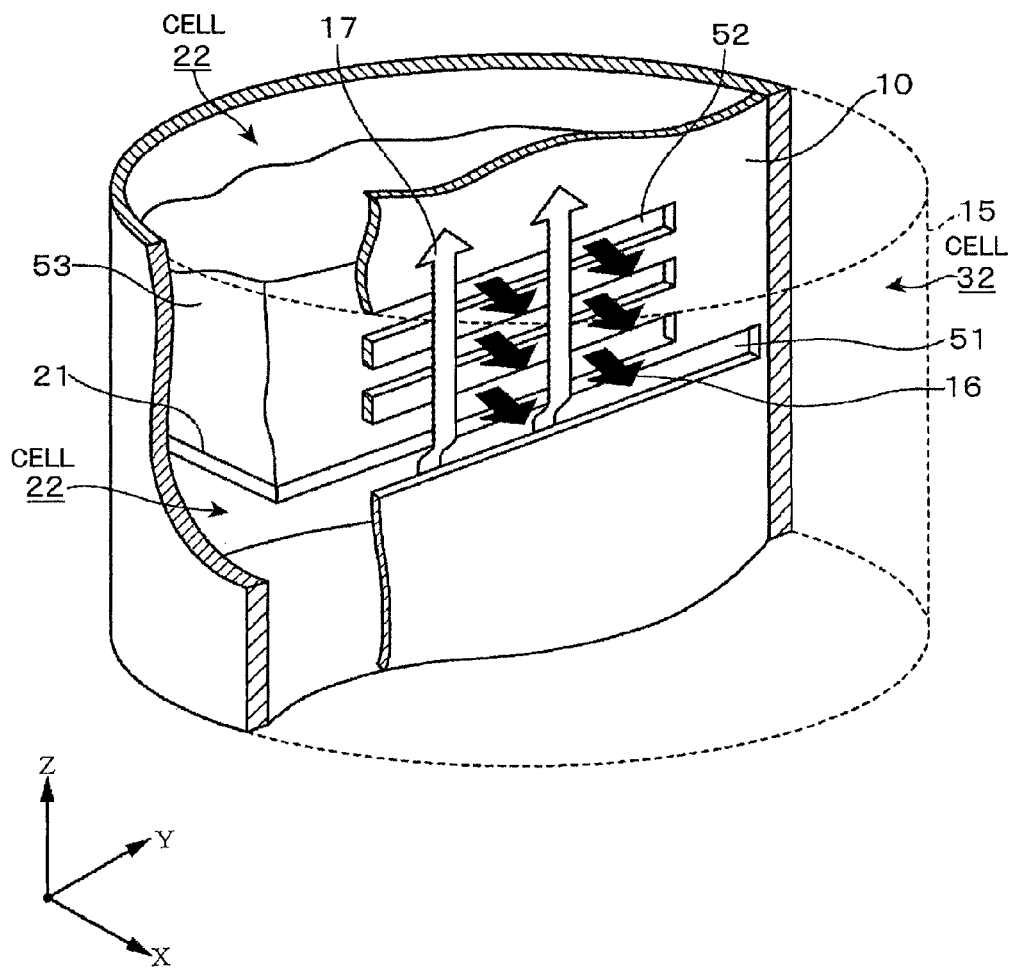
FIG. 5 is a perspective view to explain an action of the contacting space.
Figure 6:
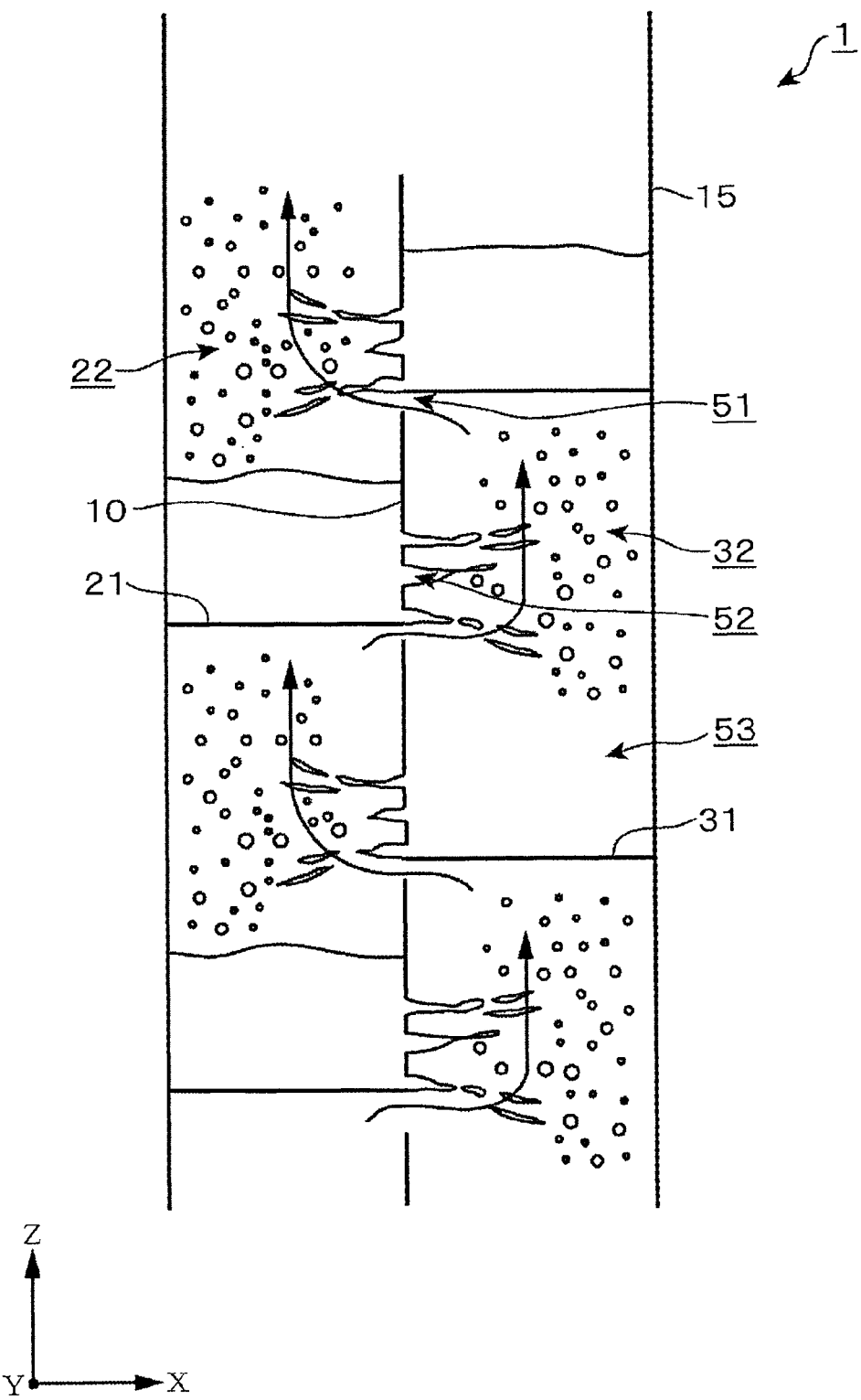
FIG. 6 is a longitudinal cross-sectional view to explain the action of the contacting space.

Based on the constitution described above, an action of the gas-liquid contactor 1 according to the present embodiment will be described with reference to FIG. 5 and FIG. 6. FIG. 5 is a perspective view to explain a gas-liquid contacting mechanism of the gas flow 17 and the liquid flow 16 in the cell 32 shown in FIG. 4, while FIG. 6 is a longitudinal cross-sectional view schematically showing a state of gas-liquid contacting in the gas-liquid contactor 1.

The liquid fed into the gas-liquid contactor 1 by the liquid feed section 11 shown in FIG. 1 flows down in the column by gravity while passing through the respective cells 22, 32, and reaches the cell 22 of the diagonally upper stage side of the cell 32 shown in FIG. 5. Here, as already described, the liquid fed into the cell 22 of the upper stage side resides in the residence section 53 by being blocked by the vertical wall 10 and forms the liquid pool. When the liquid pool is formed in the residence section 53, a potential energy of the liquid in this liquid pool is converted to a kinetic energy at the liquid flow opening 52 and becomes a force to push out the liquid to the cell 32 side of the lower stage side. As a result, when viewed from the cell 32 of the lower stage side, the liquid having resided in the residence section 53 or the cell 22 of the upper stage side is injected as the sheet-like liquid flow 16 via the slit-like liquid flow opening 52, as shown in FIG. 5. As can be known from such actions, the slit-like liquid flow opening 52 plays a role as an injection hole injecting the liquid blocked by the vertical wall 10 and residing in the residence section 53 to the cell 32 of the lower stage side.

On the other hand, the gas fed into the gas-liquid contactor 1 from the gas feed section 13 flows up in the gas-liquid contactor 1 by a pressure compressing the gas or a buoyant force acting on the gas while passing through the respective cells 22, 32, reaches the cell 22 of the diagonally lower stage side of the cell 32 shown in FIG. 5, and sent out to the cell 32 via the gas flow opening 51. As is already described, since the gas flow opening 51 is constituted in the slit shape, the gas becomes the sheet-like fast gas flow 17 and is introduced from the gas flow opening 51, when viewed from the cell 32 side, as shown in FIG. 5.

Here, as is already described, since the gas flow opening 51 of the cell 32 is provided at the position immediately below the liquid flow opening 52, the gas flow 17 intersects with the liquid flow 16 before expanding in the space of the cell 32 and reducing its speed, and flows in a manner to blow up the liquid flow 16 from below. As a result, a shear force by intersecting with the air flow 17 acts on the liquid flow 16, and the liquid flow 16 becomes liquid drops and is dispersed into the space of the cell 32, as shown in FIG. 6. In this way, by the liquid flow opening 52 and the gas flow opening 51 being disposed above and below each other, the cell 32 functions as the space in which the liquid flow 16 and the gas flow 17 are subjected to countercurrent contacting.

Further, since the fast gas flow 17 of immediately after flowing out of the gas flow opening 51 causes pressure reduction around the gas flow 17, it is also possible to attained an action of promoting injection of the liquid flow 16 by drawing in the liquid when passing through a neighborhood of the liquid flow opening 52.

Mass transfer is performed between surfaces of the liquid drops dispersed into the cell 32 and the surrounding gas, and transfer of mass proceeds from the gas to the liquid in a case of an absorption column, or from the liquid to the gas in a case of a stripping column. On the other hand, since a horizontal cross-sectional area of the space inside the cell 32 is larger than an opening area of the gas flow opening 51, the gas flow 17 flows up in the cell 32 with its speed being gradually decreased after intersecting with the liquid flow 16. When the flow of the gas flow 17 slows down, the force of the gas flow 17 blowing up the liquid drops is weakened, so that the liquid drops start to settle down to the residence section 53 and the gas and the liquid are separated. On the other hand, even in a case that the flow of the gas flow 17 decreases its speed, it is possible to separate the liquid drops sufficiently in countercurrent contacting, in which minute liquid drops is accompanied by the gas flow, by disposing a demister to the gas flow opening 51.

When reaching the horizontal wall 31 in an upper surface side, the gas flowing up in the cell 32 is sent out to the cell 22 of the diagonally upper stage side via the gas flow opening 51 provided in the vertical wall 10. On the other hand, the liquid drops having settled down to the residence section 53 merges into the pool formed in the residence section 53, a concentration is made uniform here, and thereafter the liquid drops are sent to the cell 22 of the diagonally lower stage side via the liquid flow opening 52.

In this way, in the respective cells 22, 32 in the gas-liquid contactor 1, there are repeatedly performed an operation of performing gas-liquid contacting by making the liquid be liquid drops and dispersing them into the gas and an operation of separating the gas and the liquid after the gas-liquid contacting and sending them out to the cells 22, 32 of a downstream side along the respective flow paths, whereby absorption or stripping between the gas and the liquid progresses. When the liquid reaches a column bottom, the liquid ends contacting with the gas and is discharged to the liquid discharging section 12. Similarly, as for the gas, after the gas reaches the column top, the gas ends contacting with the liquid and is discharged to the gas discharging section 14.

According to the gas-liquid contactor 1 according to the present embodiment described above, the following effect can be obtained. The inside of the gas-liquid contactor 1 performing gas-liquid contacting is divided into the plurality of cells 22, 32 forming the countercurrent contacting spaces of the gas and the liquid, and the liquid residing in the residence section 53 of the respective cells 22, 32 is injected to the cells 22, 32 of the lower stage side via the liquid flow opening 52 playing a role as the injection hole or is sent out to the cells 22, 32 of the upper stage side by using the force with which the gas flows up in the cells 22, 23. Therefore, the respective fluids can be flushed out to the neighboring cells 22, 32 without using a special pressuring means. In the respective cells 22, 32, the liquid flow 16 and the gas flow 17 which are injected in shapes of sheets, for example, are subjected to countercurrent contacting, and the liquid drops are dispersed into the gas phase, so that a good dispersion state can be created. As a result, HETS (Height Equivalent to a Theoretical Stage) becomes low, contributing to improvement of absorption efficiency, stripping efficiency or the like.

Further, in addition to the fact that the HETS is low as already described, since the gas and the liquid flows up/down with winding their ways in the column when passing through the plurality of cells 22, 32 in the gas-liquid contactor 1 according to the present embodiment, a height of the gas-liquid contactor 1 can be further made compact compared with a conventional tray column and the like in which the gas and the liquid linearly flows up/down, with residence times of the gas and the liquid in the columns being the same.

Further, since the liquid drops formed in the respective cells 22, 32 are large compared with those of a spray column and the like, separation of the gas and the liquid is easy even when the flow of the gas is fast, and it is possible to make a throughput per unit cross-sectional area large or to make a column diameter small with the same throughput.

Unlike the tray column, in which a gas is dispersed into a liquid phase residing on a tray to perform gas-liquid contacting, since the cells 22, 32 according to the present embodiment is not structured to make a gas flow pass through a liquid phase, occurrence of foaming (foaming of the liquid phase) can be evaded or restrained. Due to a difference in such a contacting mechanism from that of the tray column, a pressure loss of the gas flow becomes small, so that a motive power necessary to send out the gas to the gas-liquid contactor 1 becomes small, also contributing to energy-saving.

Since these cells 22, 32 can be easily formed by separating the inside of the gas-liquid contactor 1 by the vertical wall 10 and the horizontal walls 21, 31, it is possible to increase tray numbers easily, so that it is possible to construct a sophisticated gas-liquid contactor 1 at a low cost.

Figure 7A:
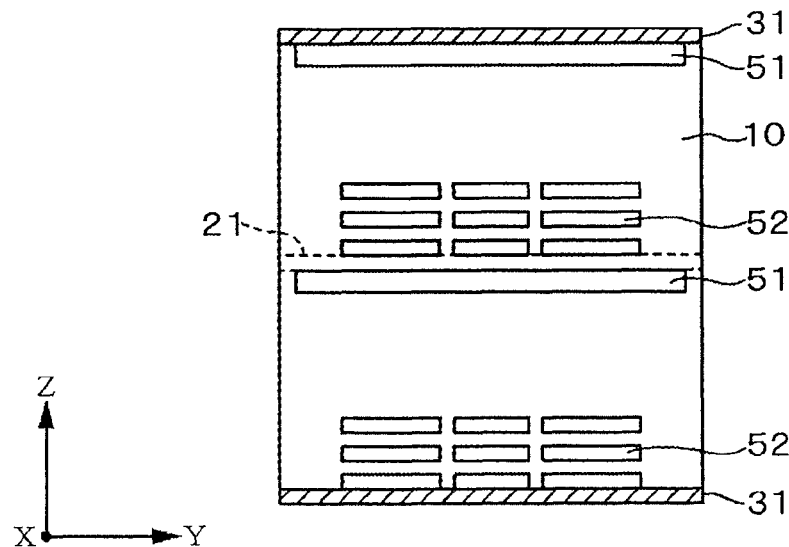
FIG. 7A to FIG. 7C are side surface views showing modification examples of inlet/outlet of a gas or a liquid fed to the contacting space.
Figure 7B:
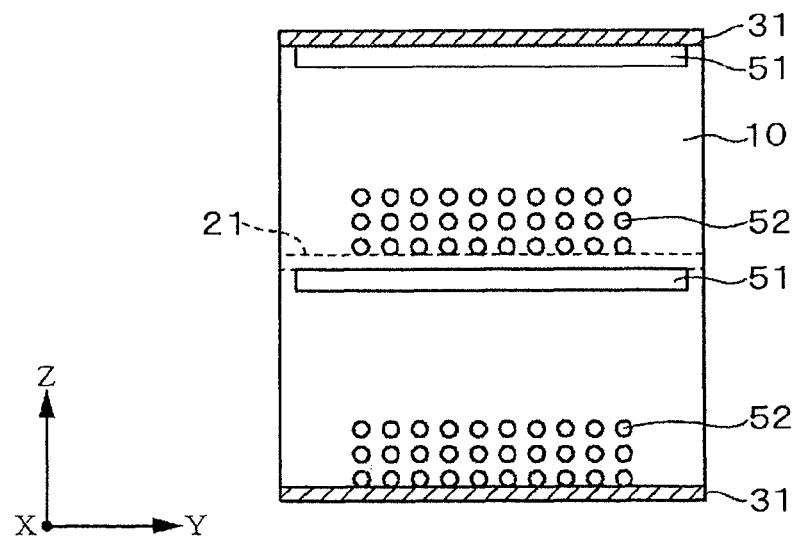
Figure 7C:
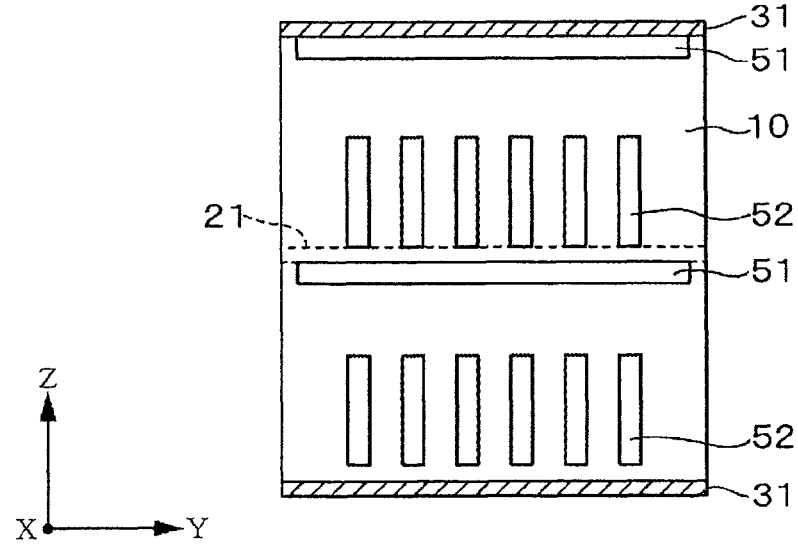

By providing the liquid flow opening 52 and the gas flow opening 51 in shapes of slits, the liquid flow 16 and the gas flow 17 can be made to be of sheet shapes to intersect with each other in the cells 22, 32, so that a stronger shear force is applied to the liquid by the gas flow 17, and the liquid flow 16 is easy to be dispersed to be smaller liquid drops, attaining a good dispersion state. It should be noted that the shapes of the liquid flow opening 52, the gas flow opening 51 and the like are not limited to the shapes shown in FIG. 3B, and it is possible that, for example, the liquid flow opening 52 is made by arranging numerous further shorter slits as shown in FIG. 7A or that numerous liquid flow openings 52 of circular hole sections are disposed as shown in FIG. 7B. It is also possible that liquid flow opening 52 is provided in a state of a plurality of long slits arranged in a vertical direction as shown in FIG.

7C, and further that the slit of the gas flow opening 51 is divided and numerous slits are arranged in a lateral direction, for example. Further, it is possible that numerous gas flow openings 51 of hole sections are arranged in the lateral direction similarly to the liquid flow opening 52 shown in FIG. 7B, illustration being omitted.

In the embodiment explained using FIG. 1 to FIG. 6, it is structured that the inside of the liquid-gas contactor 1 is vertically divided into two lines and the neighboring cells are disposed on different stages, but the number of cell lines or the shapes of the respective cells 22, 32 in the gas-liquid contactor 1 are not limited to the present embodiment. It is possible, as shown in FIG. 8A and FIG. 8B for example, that a circle drawn by an internal circumferential surface of the gas-liquid contactor 1 is vertically divided into three so that three lines of cells are arranged laterally along one direction and cells 22, 32, 42 of the respective cell lines are disposed on different stages from the stages of neighboring cells 22, 32, 42.

Figure 8A:
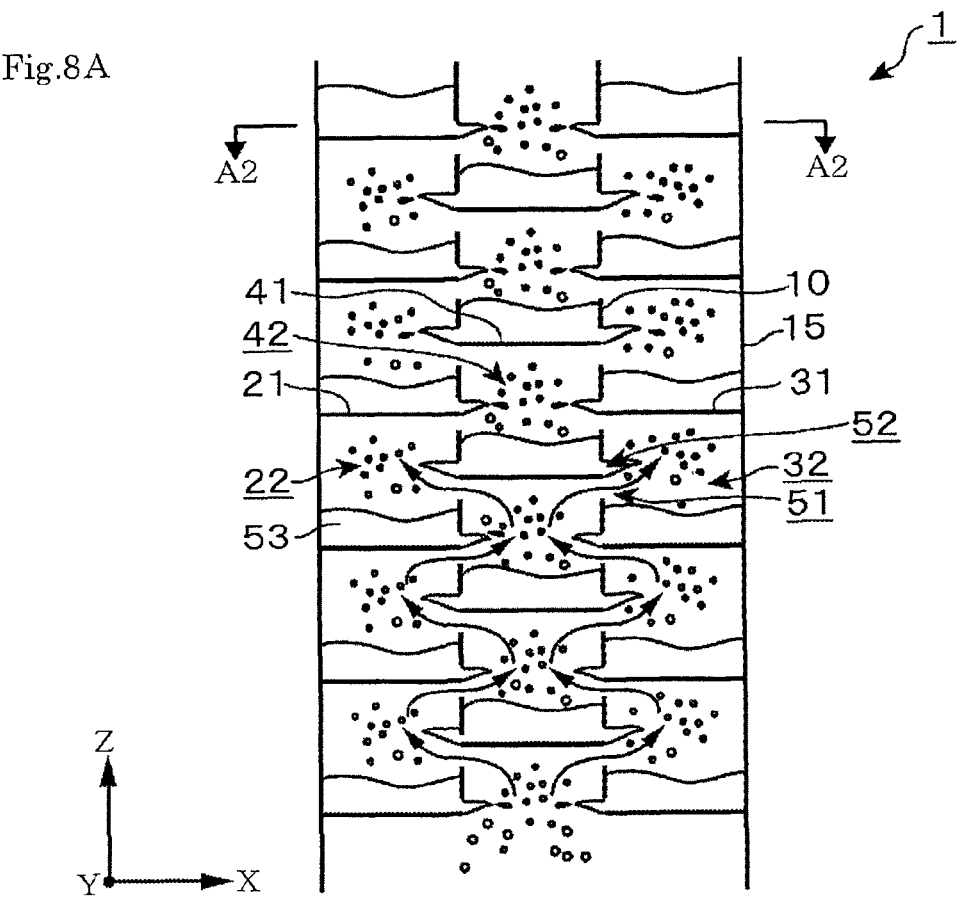
FIG. 8A and FIG. 8B are explanatory views showing a modification example of the contacting space.
Figure 8B:
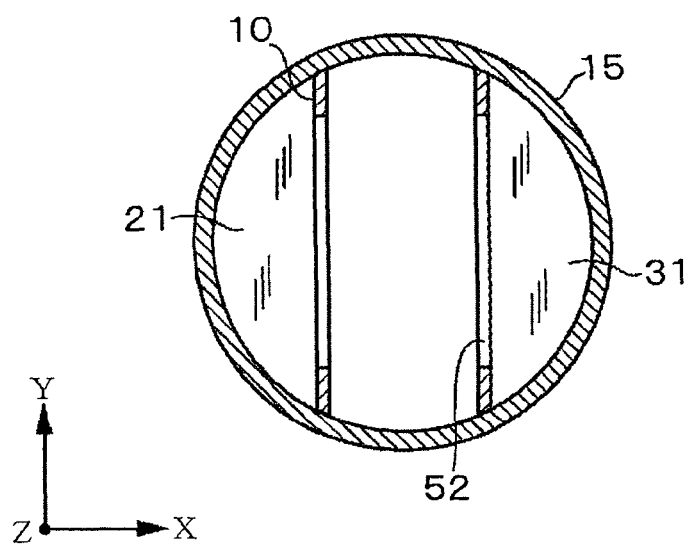
Figure 9A:
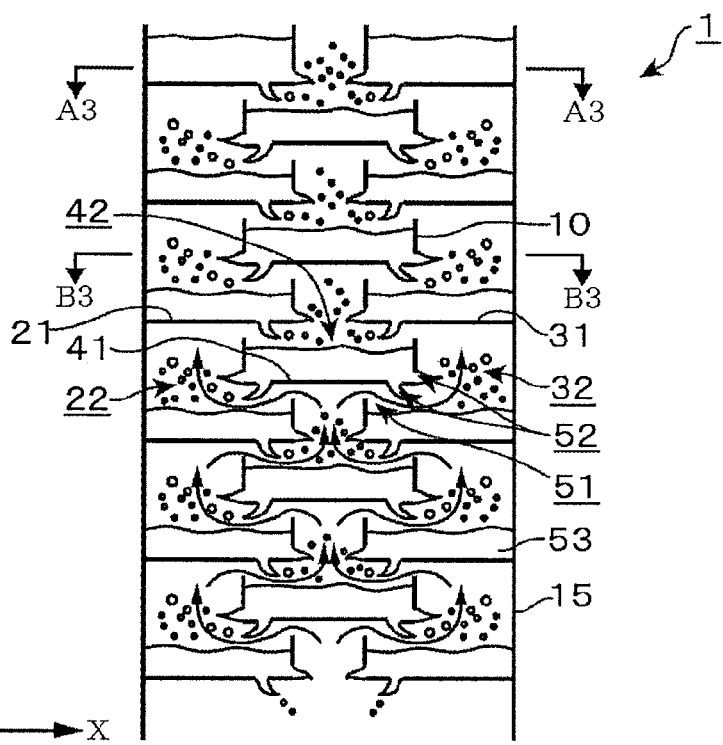
FIG. 9A to FIG. 9C are explanatory views showing a second modification example of the contacting space.
Figure 9B:
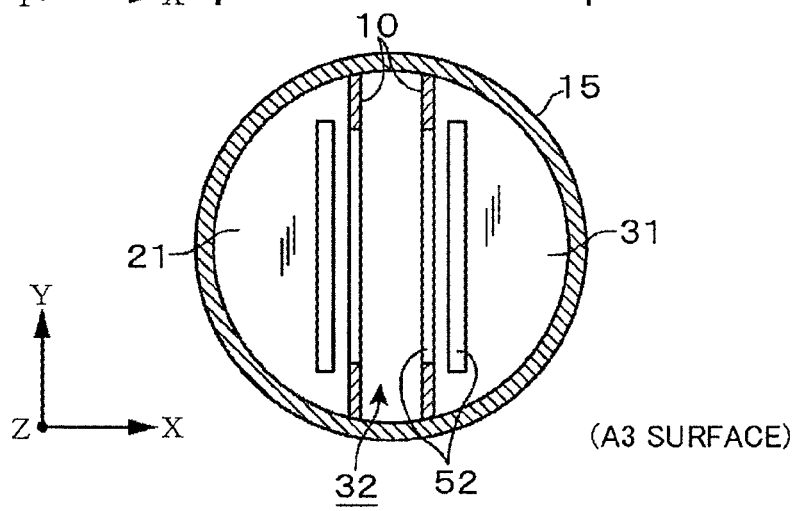
Figure 9C:
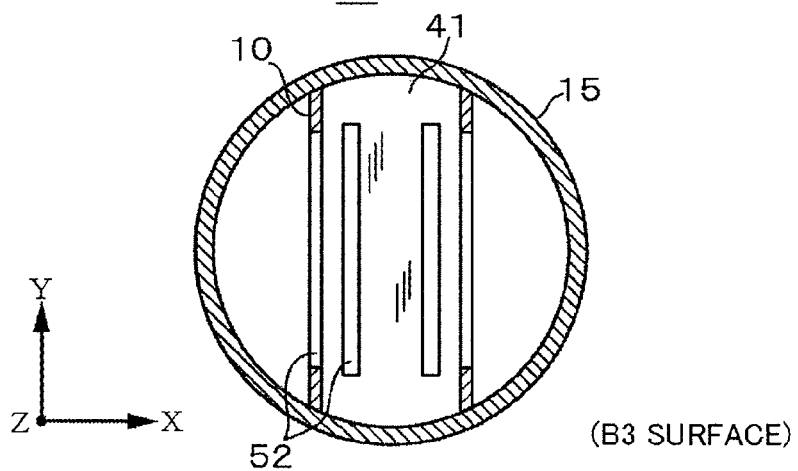

Further, the cell is not limited to the one whose X-Z cross-section is rectangular as shown in FIG. 1 or FIG. 8A. For example, as shown in FIG. 9A to FIG. 9C, it can be constituted that parts of cells 22, 32, 42 of upper stages sides and cells 22, 32, 42 of lower stages sides are stacked above and below each other so that a volume of a residence section 53 becomes large. In contrast to the above, it can be constituted that the respective cells 22, 32, 42 in FIG. 9A are made upside down so that a volume of a residence section 53 becomes small.

Figure 10A:
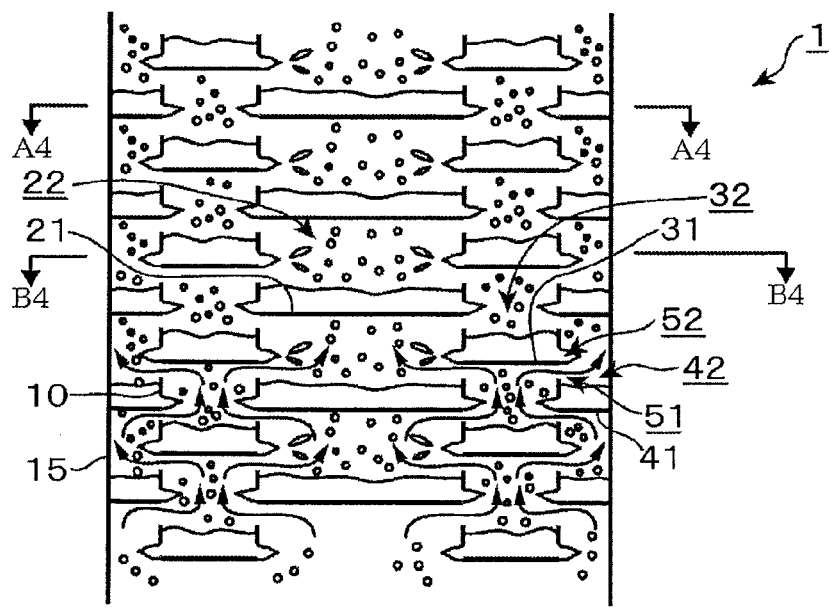
FIG. 10A to FIG. 10C are explanatory views showing a third modification example of the contacting space.
Figure 10B:
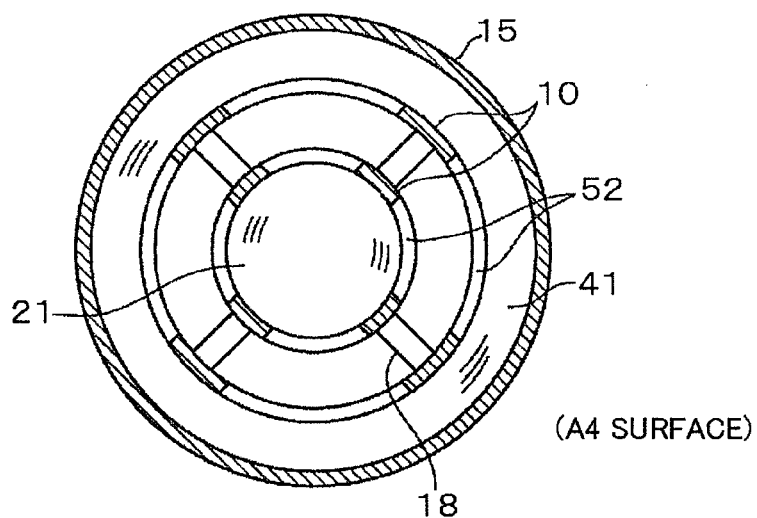
Figure 10C:
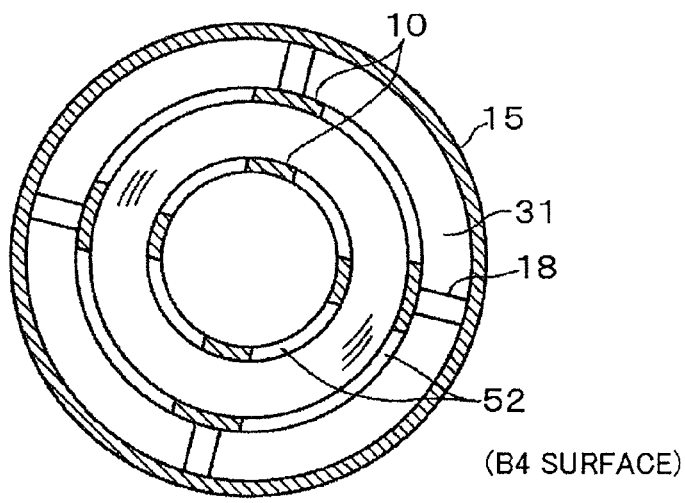

When it is constituted that the parts of the cells 22, 32, 42 of the upper stage sides and the lower stage sides are stacked above and below each other, disposition of liquid flow openings 52 is not limited to be in a vertical wall 10 as exemplified above, but it is possible to constitute that the liquid flow openings 52 are provided in horizontal walls 21, 31 of bottom surface sides of the cells 22, 32 as shown in FIG. 9A and FIG. 9C. Further, in FIG. 10A to FIG. 10C, there is shown an example of a gas-liquid contactor 1 having a structure that the inside of the gas-liquid contactor 1 is concentrically divided in a vertical direction and cylindrical cell lines are arranged concentrically laterally, and such type of the gas-liquid contactor 1 is also included in the present invention. It should be noted that a reference numeral 18 in the drawings indicates a beam to support cells 22, 32 of an inner side.

Figure 11A:
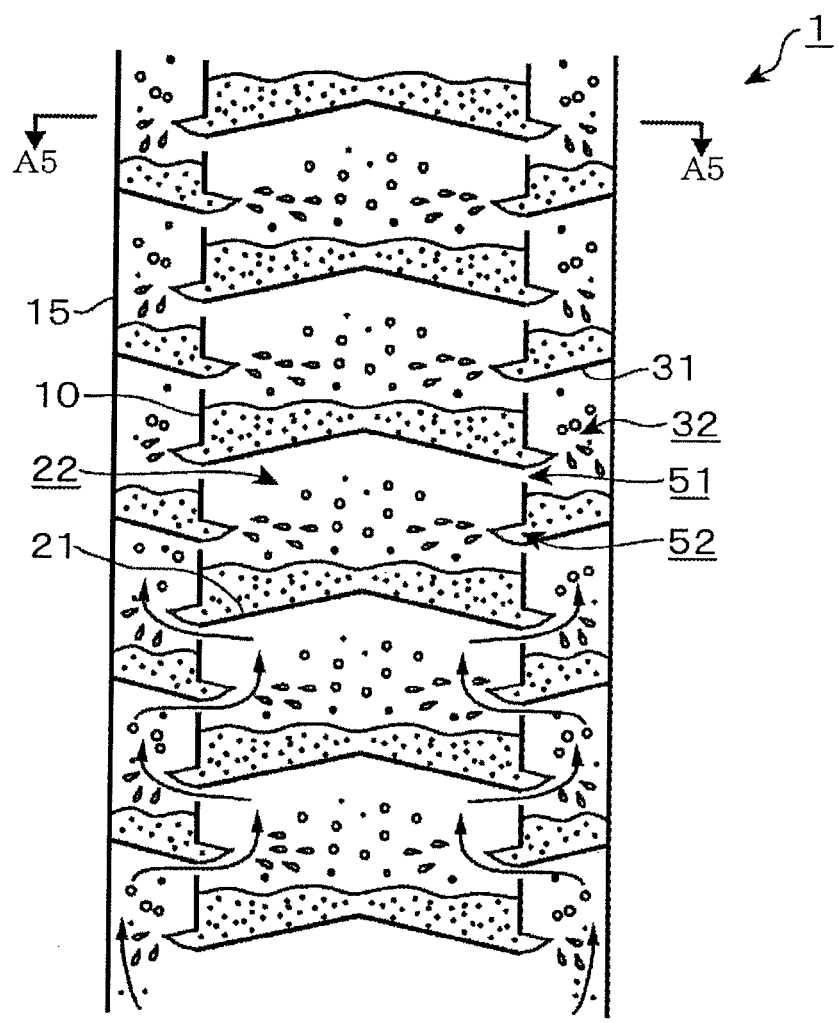
FIG. 11A and FIG. 11B are explanatory views showing a fourth modification example of the contacting space.
Figure 11B:
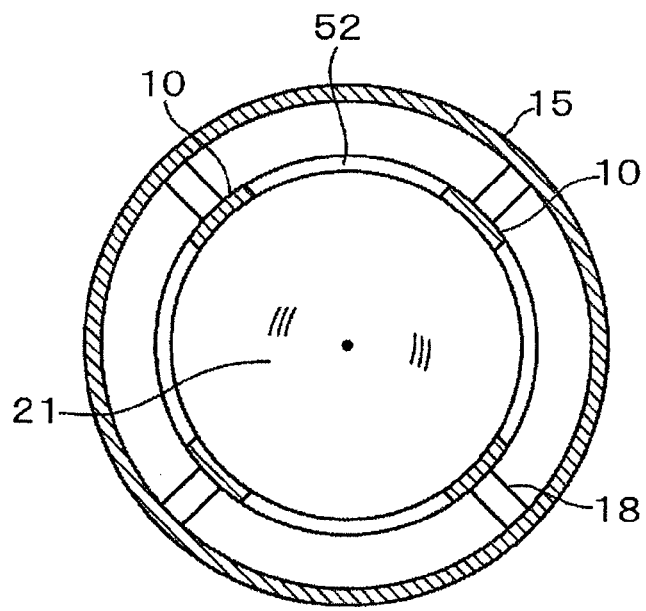

Subsequently, in FIG. 11A and FIG. 11B, there is exemplified a gas-liquid contactor 1 used for an absorption column or a stripping column in which slurry including a granular solid impurity in a liquid is processed and for a catalytic reaction column in which slurry including a catalyst and a gas are made to contact with each other to generate a reaction. When the slurry is processed in the gas-liquid contactor 1, there is a possibility that a granular material in the slurry settles down and accumulates on horizontal walls 21, 31 to disturb flow of the slurry flowing down in a column. Thus, in the gas-liquid contactor 1 shown in FIG. 11A and FIG. 11B, the horizontal walls 21, 31 are sloped, and a slope becomes lower toward a gas flow opening 51, whereby the granular material in the slurry can be discharged to downstream cells 22, 32 without accumulating on the horizontal walls 21, 31. It should be noted that objects to be processed to which such a gas-liquid contactor 1 can be applied is not limited to the slurry including the granular material but the gas-liquid contactor 1 can be applied to solid-gas contacting of a granular material (a solid body) flowing down in the gas-liquid contactor 1 and a gas as well as to solid-liquid contacting of a granular material (a solid body) flowing down in the gas-liquid contactor 1 and a liquid.

In the gas-liquid contactor 1 according to the present embodiment, as explained using FIG. 5 and FIG. 6 for example, the liquid flow 16 injected from the liquid flow opening 52 from the liquid pool having formed in the residence section 53 and the gas flow 17 flowing up via the gas flow opening 51 are made to intersect each other, so that the liquid flow 16 is blew up and the shear force is applied to the liquid flow 16 to disperse the liquid drops in the respective cells 22, 32, whereby the good gas-liquid dispersion state is created. Here, when the gas-liquid contactor 1 is operated in a low throughput and so on, for example, there may be a case that the flow speed of the gas flow 17 flowing out from the gas flow opening 51 slows down to weaken the force to blow up the liquid flow 16 as well as the shear force, resulting in deterioration of the gas-liquid dispersion state.

In FIG. 6, a state is illustrated that the liquid is injected from all the slits constituting the liquid flow opening 52, but in the low throughput operation or the like, a liquid depth of the liquid pool may be sometimes lower than the position of the slit provided in the upper stage side. In this case, the liquid is not injected from the slit provided in a higher position than the liquid pool and the cell 32 of, the lower stage side and the cell 22 of the upper stage side become in a state of being connected via that slit. As a result, part of the gas flowing up in the cell 32 of the lower stage side may flow into the cell 22 of the upper stage side via the connecting slit, to reduce the flow speed of the gas flow 17 passing through the gas flow opening 51 and deteriorate the gas-liquid dispersion state.

Figure 12A:
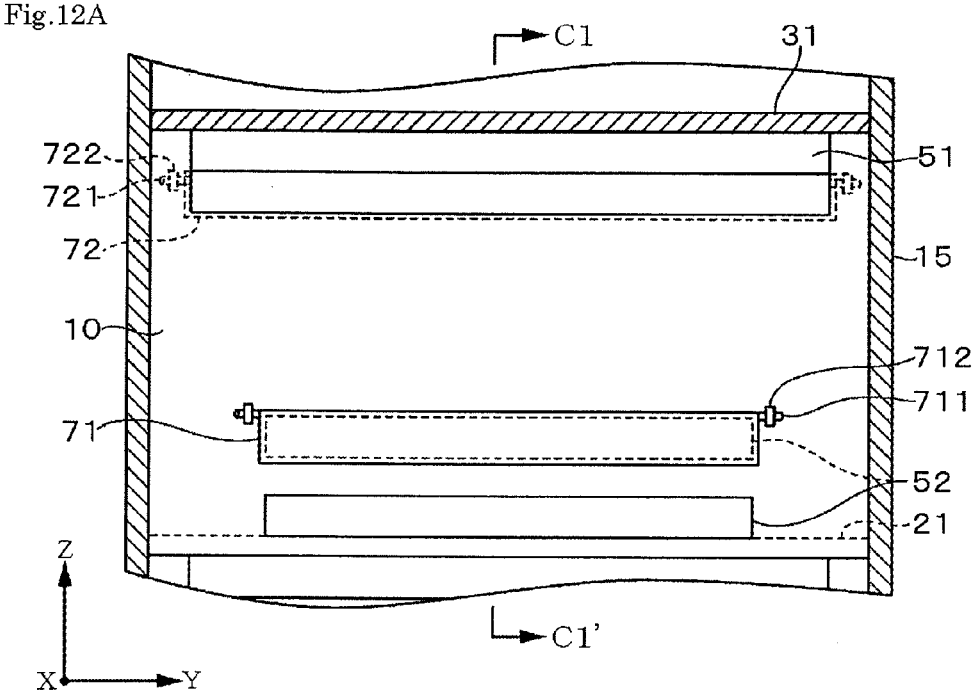
FIG. 12A and FIG. 12B are a front view and a longitudinal cross-sectional view of a cell having first and second shutters.
Figure 12B:
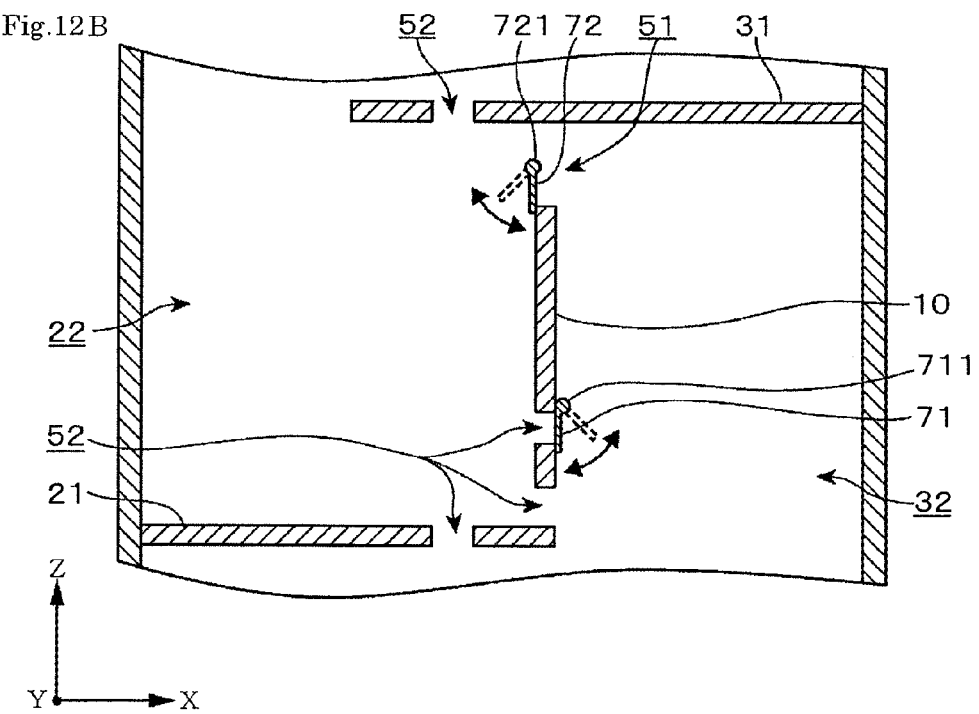

Cells 22, 32 shown in FIG. 12A and FIG. 12B have a mechanism to prevent such deterioration of the gas-liquid dispersion state in the low-throughput operation or the like. FIG. 12A is a front view of a vertical wall 10 of the cell 22 shown in FIG. 13A for example, the vertical wall 10 being viewed from the cell 32 of a downstream side, while FIG. 12B is a longitudinal cross-sectional view of the cell 22 viewed from a C1-C1' surface shown in FIG. 12A. In examples shown in the following FIG. 12A to FIG. 18B, there are described cases that the respective cells 22, 32 have a liquid flow opening 52 constituted with three slits in total, that is, two slits provided in a vertical wall 10 and one slit provided in horizontal walls 21, 31.

In the example shown in FIG. 12A and FIG. 12B, the cell 22 has a first shutter to prevent the cell 22 from becoming in a state of being connected with the neighboring cell 32 in a case that a liquid depth of a liquid pool becomes lower than a position where the slit of the liquid flow opening 52 is provided. In the present example, the first shutter is provided in an upper stage side of the liquid flow opening 52 (slits) provided as two stages of upper and lower slits in the vertical wall 10. The first shutter has a shutter plate 71 of a rectangular shape slightly larger than the slit, for example, and a pivot shaft 711 protruding horizontally to right and left is provided in an upper end portion of the shutter plate 71.

The shutter plate 71 is disposed, as shown in FIG. 12B, in an outlet side of the liquid flow opening 52 (slit) viewed from the cell 22 in which the liquid pool is formed, that is, in a surface of the vertical wall 10 in the cell 32 of the downstream side to which the liquid flow 16 flows out. On the vertical wall 10 surface is fixed a shaft receiving section 712 of a ring shape, for example, and by making the above-described pivot shaft 711 penetrate the shaft receiving section 712, the shutter plate is disposed in a state of being pendent from the pivot shaft 711.

As already stated, the shutter plate 71 is formed to have a size slightly larger than the slit constituting the liquid flow opening 52, and even if a force is applied from a direction of the cell 32 shown in FIG. 12B, the shutter plate 71 is locked, by the vertical wall 10, in a state of covering the slit. On the other hand, if a force is applied from a direction of the cell 22 shown in FIG. 12B, the shutter plate 71 pivots toward the inside of the cell 32 of the lower stage side in correspondence with the applied force, so that the covered slit can be released. Here, it is also possible to provide a biasing means, a coil spring for example, biased in a direction to close the shutter plate 71 for example, that is, in a direction to press the shutter plate 71 onto a wall surface of the vertical wall 10, in combination with the pivot shaft 721 to adjust a flow amount of the liquid flow 16 at a time that the shutter plate 71 begins to open.

Next, a constitution of a second shutter provided to a gas flow opening 51 will be described. The second shutter has, similarly to the aforementioned first shutter, a shutter plate 72 of a long rectangular shape, a pivot shaft 721 provided in an upper end portion of the shutter plate 72 and protruding horizontally to right and left, and a shaft receiving section 722 to be penetrated by the pivot shaft 721. Here, in the present example, a shutter plate 72 of the second shutter is formed to have a width slightly larger than the gas flow opening 51 formed in a slit shape and a height of about half the height of the gas flow opening 51. The shaft receiving section 722 is disposed in the cell 22 side into which a gas flow 17 flows out, in a manner that, for example, a position on which the pivot shaft 721 is stretched is almost the middle of the height of the gas flow opening 51, and the pivot shaft 721 is made to penetrate the shaft receiving section 722, whereby the shutter plate 72 is disposed in a state of being pendent from the pivot shaft 721.

As a result, the shutter plate 72 becomes in a state that the shutter plate 72 covers a part of the gas flow opening 51, for example, a lower half of the gas flow opening 51, and even if a small force not enough to lift the shutter plate 72 is applied from a direction of the cell 32 shown in FIG. 12B, the shutter plate 72 hardly moves from the state of closing the part of the gas flow opening 51. However, as the force applied from the direction of the cell 32 becomes further larger, the shutter plate 72 pivots toward the inside of the cell 22 centering on the pivot shaft 721, so that the gas flow opening 51 having been covered is gradually released. Here, it is also possible to provide a biasing means, a coil spring for example, biased in a direction to close the shutter plate 72 for example, that is, in a direction to press the shutter plate 72 onto the wall surface of the vertical wall 10, in combination with the pivot shaft 721 to adjust a flow amount of the gas flow 17 at a time that the shutter plate 72 begins to open.

Figure 13A:
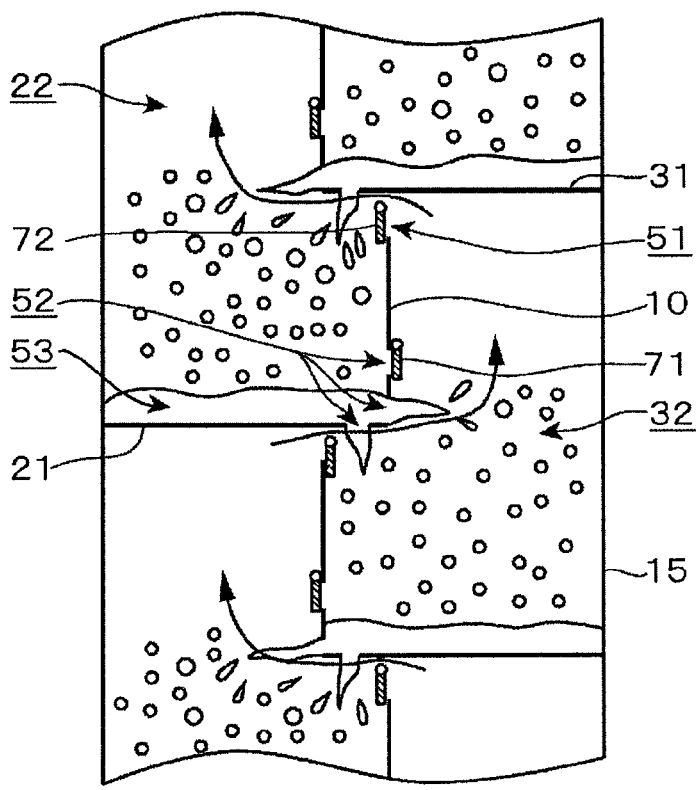
FIG. 13A and FIG. 13B are explanatory views showing an action of the cell having the first and second shutters.

An action of the first shutter of the two shutters described above will be explained. As shown in FIG. 13A, in a case that the throughput of the gas-liquid contactor 1 is low and a liquid level (liquid amounts of downflow fluid) of the liquid pool formed in the residence section 53 of the respective cells 22, 32 does not reach the slit of the upper stage side constituting the liquid flow opening 52, the force to make the shutter plate 71 of the first shutter pivot does not work. Thus, the shutter plate 71 covers the slit in a state of being pendent from the pivot shaft 711 and in a state that the shutter plate 71 is pressed onto a surface of the vertical wall 10 by a pressure difference between, for example, the inside of the cell 32 of the lower stage side and the inside of the cell 22 of the upper stage side, or between the inside of the cell 22 of the lower stage side and the inside of the cell 32 of the upper stage side.

As a result, the gas flowing up in the cells 32, 22 of the lower stage side can be prevented from flowing into the cells 22, 32 of the upper stage side via that slit, so that a flow speed of the gas flow 17 passing through the gas flow opening 51 is not slowed down. On the other hand, when the throughput of the gas-liquid contactor 1 increases and the liquid level of the liquid pool reaches the slit of the upper stage side, the force to make the shutter plate 71 pivot is applied and, as shown in FIG. 13B, the slit having been covered is released, so that the liquid flow 16 can be injected in correspondence with the liquid level (liquid amount) of the liquid pool.

Next, an operation of the second shutter will be explained. In the state of the low throughput shown in FIG. 13A, since an amount of the gas flowing up in the respective cells 22, 32 is small, the force working on the shutter plate 72 is small, so that the shutter plate 72 hardly moves and keeps covering the lower half of the gas flow opening 51. As a result, an opening area of the gas flow opening 51 becomes small, and so it is possible to restrain slow down of the flow speed of the gas flow 17 passing through the flow opening 51 even in the case that the amount of the gas flowing up in the respective cells 22, 32 is small.

Figure 13B:
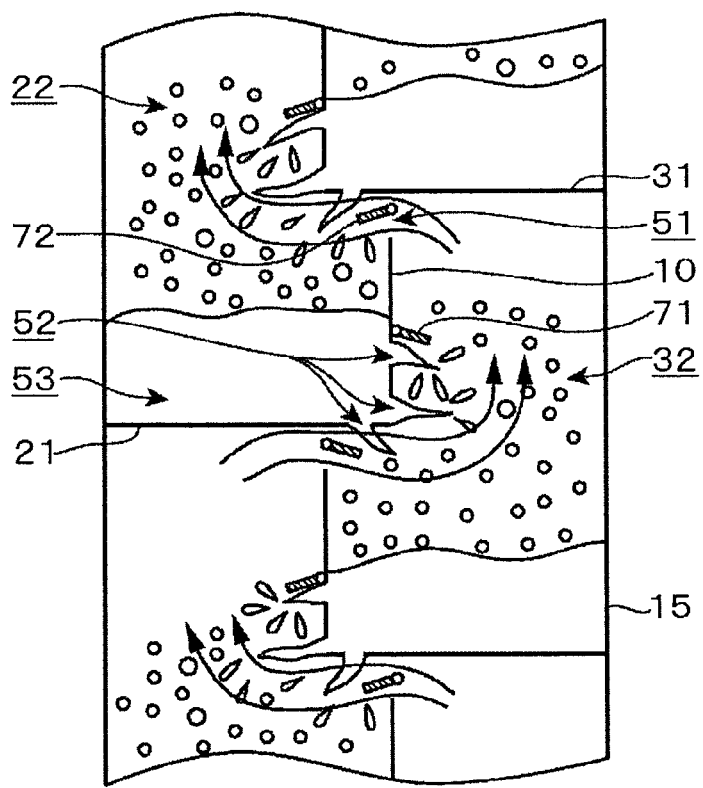

As shown in FIG. 13B, when the throughput of the gas-liquid contactor 1 increases, the amount of the gas flowing up in the respective cells 22, 32 also increases to lead to larger pressure application by the gas, whereby the shutter plate 72 pivots to release the gas flow opening 51 having been covered, so that the opening area through which the gas flow passes becomes large. As a result, it is possible to form a gas flow 17 maintaining a necessary flow speed without largely increasing a pressure loss compared with a state in which the opening area is kept small.

By providing these first shutter and second shutter, even in the case that the throughput of the gas-liquid contactor 1 is low, it is possible to restrain slow down of the flow speed of the gas flow 17 passing through the gas flow opening 51 and maintain the force to blow up the liquid flow 16 injecting from the liquid flow opening 52 and the shear force working on the liquid flow 16 so that the good dispersion state of the gas and liquid can be maintained.

Figure 14:
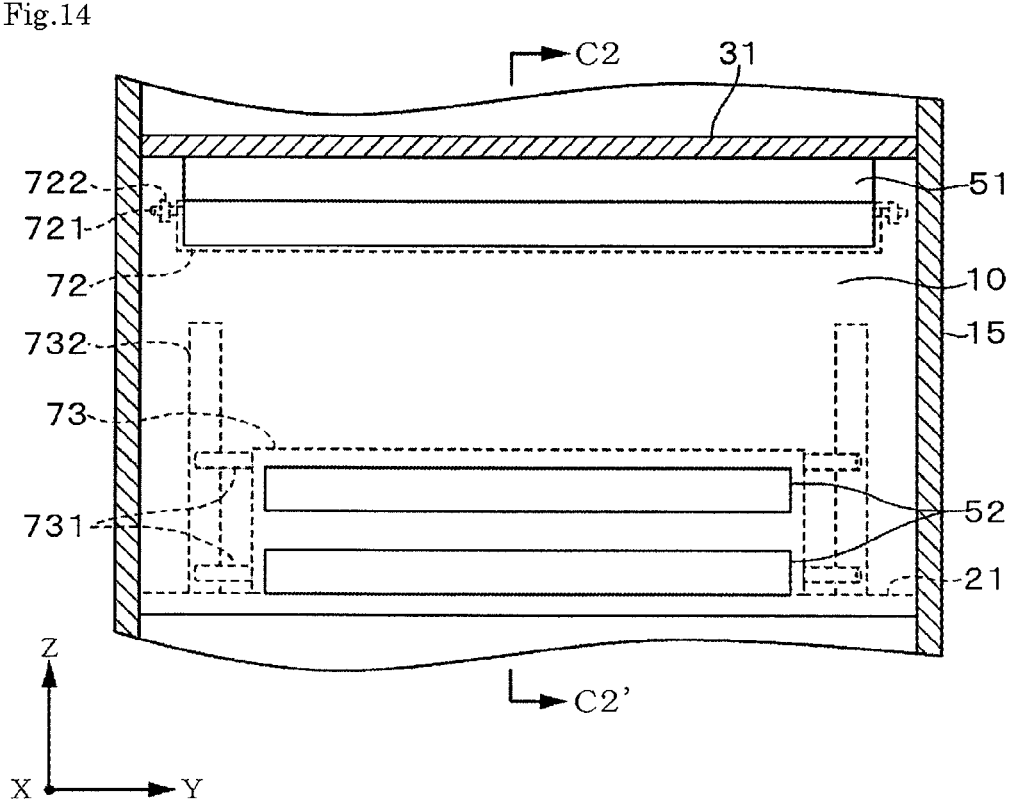
FIG. 14 is a front view of a cell according to a first modification example of the first shutter.
Figure 15:
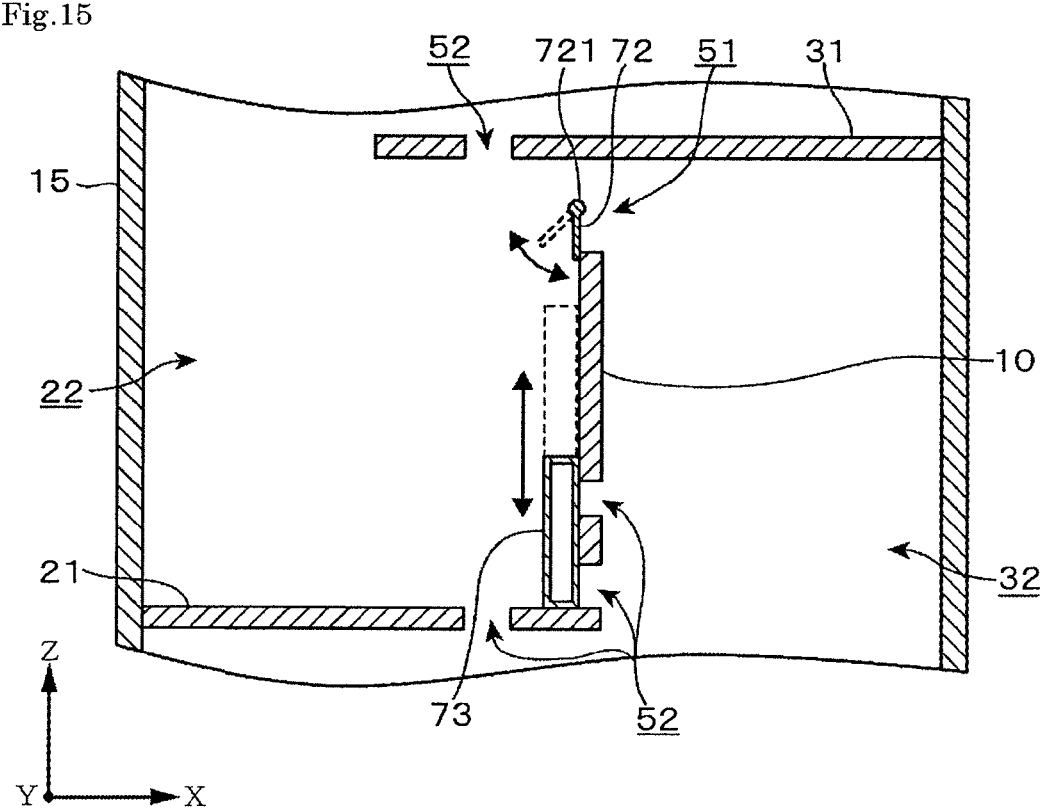
FIG. 15 is a longitudinal cross-sectional view of a cell according to the first modification example.

Here, the constitution of the first shutter is not limited to the pivot type shown in FIG. 12A and FIG. 12B. For example, as shown in FIG. 14 to FIG. 15, it is possible to constitute a shutter plate 73 with, for example, a hollow stainless steel member and the like, the shutter plate 73 moving up and down along a vertical wall 10 by receiving buoyancy from a liquid pool residing in respective cells 22, 32, whereby a liquid flow opening 52 (slit) is opened and closed. In the drawing, a reference numeral 732 indicates a guide member guiding a moving direction of the shutter plate 73, while a reference numeral 731 indicates a slider interposed between the shutter plate 73 and the guide member 732 and running in the guide member 732.

Figure 16A:
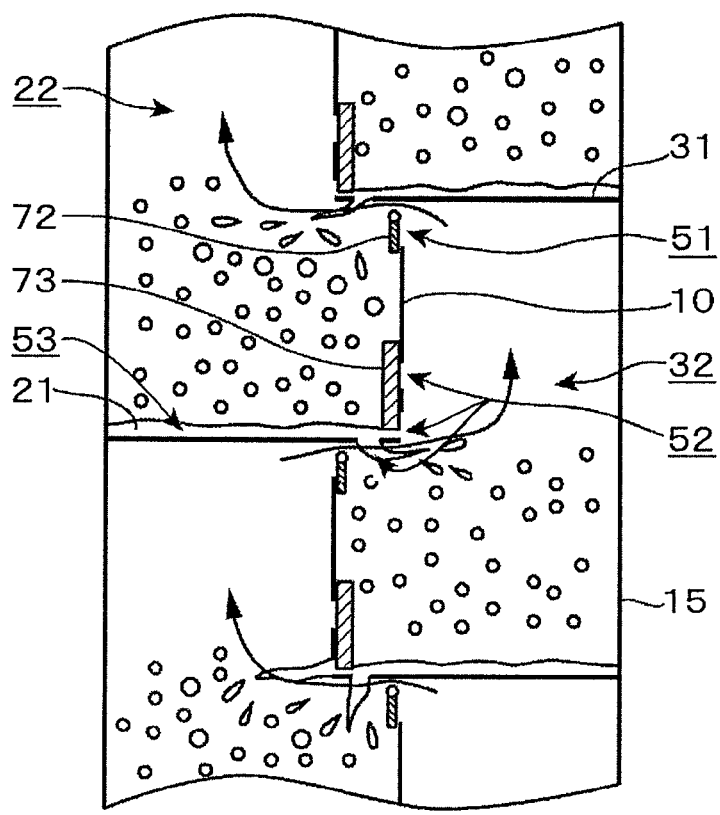
FIG. 16A and FIG. 16B are explanatory views showing an action of the cell according to the first modification example.

In the present example, the shutter plate 73 is constituted to be able to open and close the two slits (liquid flow opening 52) provided in two stages of upper and lower slits in the vertical wall 10. In a case that a low throughput operation is performed in the gas-liquid contactor 1 as shown in FIG. 16A for example, a liquid level of the liquid pool is low, the shutter plate 73 hardly moves up from a down position and the slits (liquid flow opening 52) provided in the vertical wall 10 is in a state of being closed, a liquid flow 16 injecting only from a slit (liquid flow opening 52) provided in a horizontal wall 21.

Figure 16B:
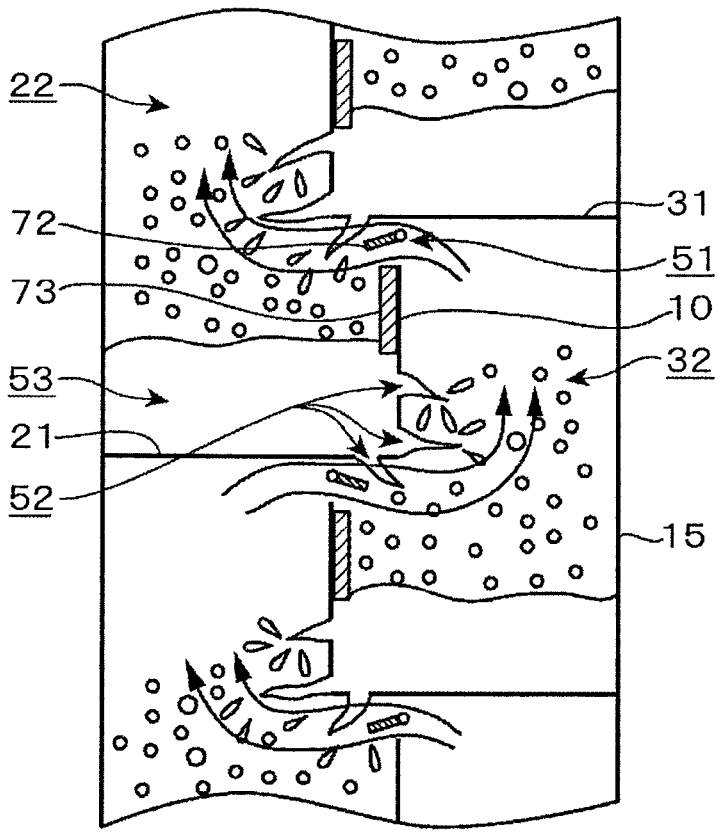

When the throughput of the gas-liquid contactor 1 increases and the liquid level of the liquid pool in a residence section 53 begins to rise, the shutter plate 73 having received the buoyancy from the liquid pool moves up to an up position, so that the slit (liquid flow opening 52) of a lower stage side of the vertical wall 10 opens and starts injection of the liquid flow 16. When the throughput further increases, the slit (liquid flow opening 52) of an upper stage side also opens, so that the liquid flow 16 injects from all the slits as shown in FIG. 16B.

Figure 18A:
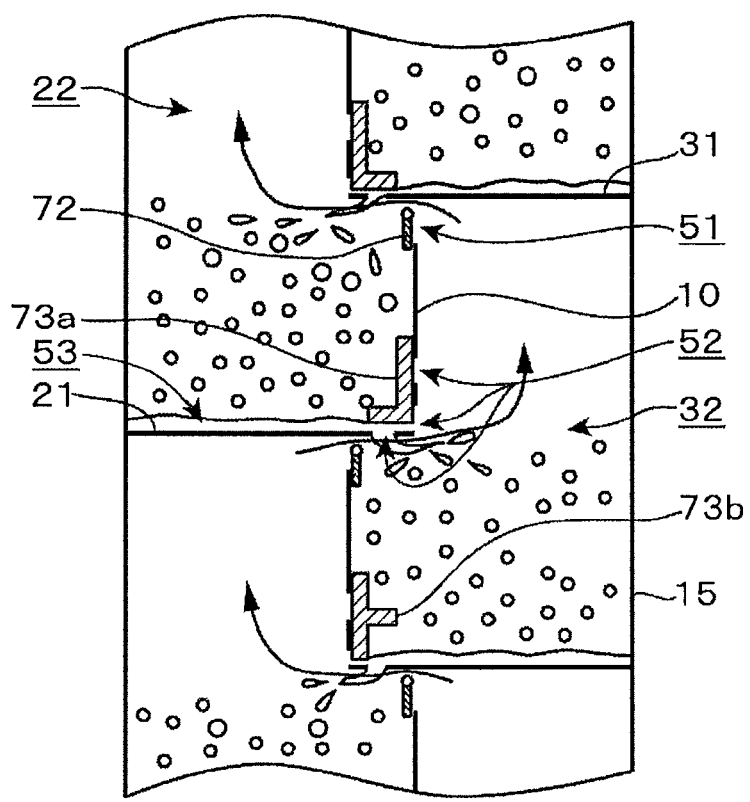
FIG. 18A and FIG. 18B are explanatory views showing actions of the cells according to the second and third modification examples.
Figure 18B:
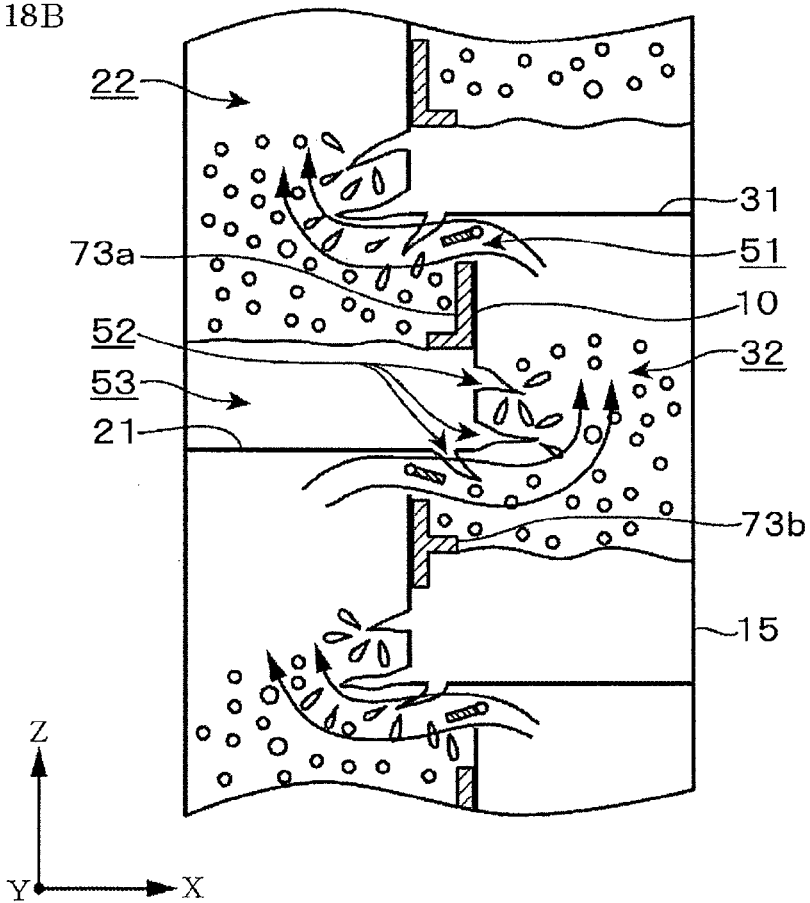

Here, a constitution of the shutter plate 73 moving up and down by the buoyancy of the liquid pool is not limited to of a flat shape shown in FIG. 14 to FIG. 16B, but it is also possible to provide, as shown in FIG. 17A for example, a protruding plate 74 protruding along the horizontal wall 21 in a lower edge portion of a shutter plate 73a so that a cross-section of the entire plate 73a has an L-shape. In this case, as shown in FIG. 18A and FIG. 18B, slits (liquid flow openings 52) provided in the horizontal walls 21, 31 can also be opened and closed in correspondence with a liquid level of a liquid pool.

As shown in FIG. 17B, it is also possible to provide a buoyancy compensator 75 protruding in a lateral direction toward inside of a cell 22 of an upper stage side at a predetermined height position of a shutter plate 73b so that a cross-section of the entire plate 73b has a T-shape. By providing the buoyancy compensator 75, it becomes possible to change buoyancy working on the shutter plate 73b in correspondence with a liquid level of a liquid pool, as shown in FIG. 18A and FIG. 18B for example. As a result, by changing the height position at which the buoyancy compensator 75 is provided, for example, it is possible to adjust a liquid level of a liquid pool in the residence section 53 at a time that the respective slits (liquid flow opening 52) is opened and closed. It should be noted that the shutter plates 73, 73a, 73b moving up and down by receiving the buoyancy of the pool are not limited to be constituted with the hollow member, but can be constituted with a member, of plastic for example, whose specific gravity is lighter than that of a liquid processed in a gas-liquid contactor 1.

Different variations of constitutions of the cells 22, 32, 42 described above may be determined from a comprehensive standpoint, considering, for example, a throughput of the gas-liquid contactor 1, a residence time of a gas or a liquid in the respective cells 22, 32, 42, efficiency of absorption or stripping, easiness of flow of a gas or a liquid to be dealt with, easiness of maintenance or construction, and the like.

Figure 19:
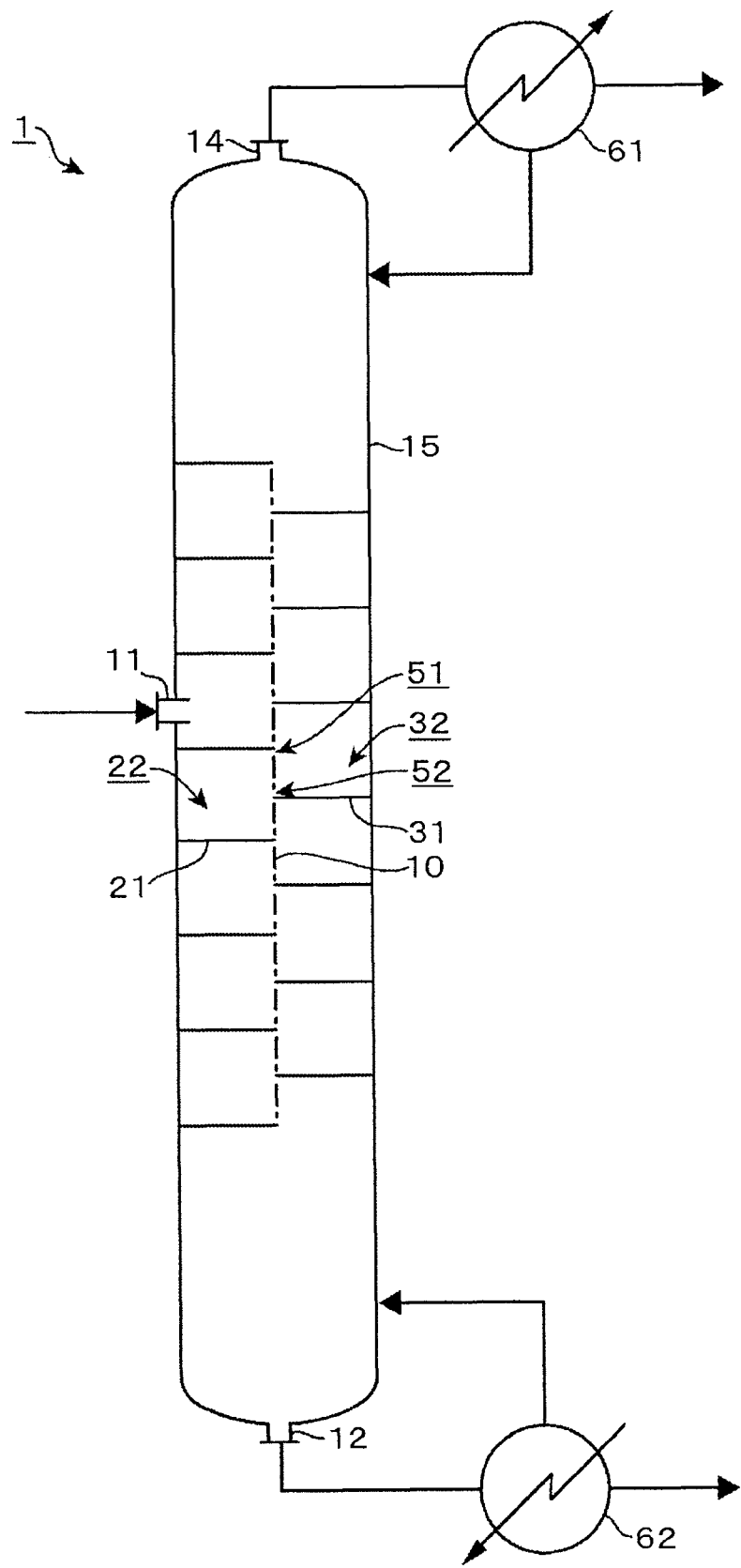
FIG. 19 is a longitudinal cross-sectional view showing an applied example of an interior of the gas-liquid contactor to a distillation column.

Further, the gas-liquid contactor 1 according to the present invention can also be applied to a distillation column separating and refining a liquid, for example, as shown in FIG. 19. A gas-liquid contactor 1 shown in FIG. 19 is provided with a liquid feed section 11 feeding, for example, a liquid heated in advance, in a middle stage of the gas-liquid contactor 1, and a temperature gradient is provided between a column top side and a column bottom side to approach a vapor-liquid equilibrium in correspondence with temperatures in respective cells 22, 32, whereby a light component is discharged from a gas discharging section 14 on the column top and a heavy component is discharged from a liquid discharging section 12 on the column bottom. It should be noted that a reference numeral 61 in FIG. 19 indicates a condenser to condense a gas discharged from the gas discharging section 14, while a reference numeral 62 indicates a reboiler to reheat a liquid discharged from the liquid discharging section 12.

Hereinabove, there are described the embodiment and its modification examples related to the gas-liquid contactor 1 in which the gas and the liquid are made to contact with each other, but combinations of fluids which can be dealt with by the contactor according to the present invention are not limited thereto. As a second embodiment, the present invention can be applied to a liquid-liquid contactor 1a to perform, for example, extraction and the like by liquid-liquid contacting of a light liquid (an upflow fluid) flowing up in a column and a heavy liquid (a downflow fluid) flowing down in the column, for example.

Figure 20:
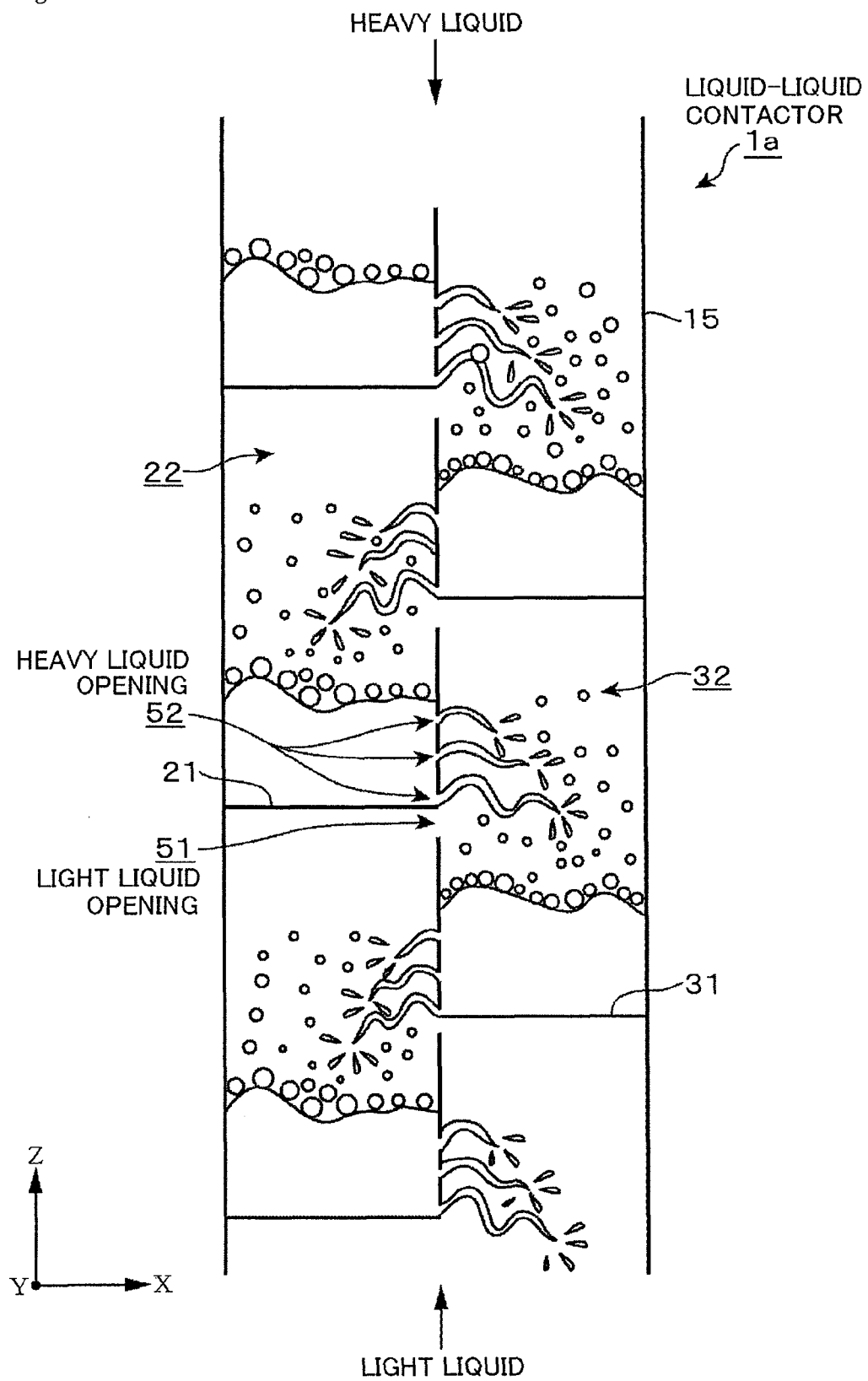
FIG. 20 is a longitudinal cross-sectional view to explain an action of a liquid-liquid contactor according to a second embodiment of the present invention.

FIG. 20 is a longitudinal cross-sectional view schematically showing a state of the inside of the liquid-liquid contactor 1a according to the second embodiment, and the same reference numerals as in FIG. 6 are given to components whose constitutions are similar to those in the first embodiment. In the present embodiment, the entire constitution of the liquid-liquid contactor 1a is similar to the constitution of the gas-liquid contactor 1, for example, shown in FIG. 1 except that a reference numeral 11 indicates a heavy liquid feed section, a reference numeral 12 indicates a heavy liquid discharging section, a reference numeral 13 indicates a light liquid feed section and a reference numeral 14 indicates a light liquid discharging section, illustration being omitted. Constitutions of respective is cells 22, 32 are similar to those shown in FIG. 4 and illustration is omitted, but the constitutions are different from those of the cells 22, 32 according to the first embodiment in that a reference numeral 51 indicates a light liquid opening and a reference numeral 52 indicates a heavy liquid opening.

In the liquid-liquid contactor 1a according to the second embodiment, the heavy liquid residing in the cells 22, 32 of upper stage sides are injected by a potential energy thereof in a shape sheet to the cells 22, 32 of lower stage sides via heavy liquid openings (injection holes) 52 which are provided in slit shapes. On the other hand, from the cells 22, 32 of the lower stage sides, the light liquid flows into the cells 22, 32 of the upper stage sides in sheet-like flows while flowing up by buoyancy through slit-like light liquid openings 51 provided immediately below the heavy liquid openings 52.

The liquid-liquid contactor 1a shown in FIG. 20 is constituted so that the heavy liquid becomes a disperse phase and the light liquid becomes a continuous phase, and a flow speed of the light liquid rapidly increases at the light liquid opening 51 provided in a lower side near the heavy liquid opening 52, and the light liquid flows into the cells 22, 32 of the upper stage sides in a state that the flow speed is maximum, and thereafter the flow speed of the light liquid rapidly decreases as being apart from the light liquid opening 51. When the heavy liquid injecting in the shape of sheet through a plurality of heavy liquid openings 52 provided in a longitudinal direction rushes into a region into which the light liquid flows, sheet-like flow of the heavy liquid is deformed and amplified to be a corrugated plate form as shown in FIG. 20, an area of a liquid-liquid interface is made larger and the sheet-like flow of the heavy liquid finally breaks up to be numerous liquid drops. Further, the liquid drops generated in the heavy liquid opening 52 of the upper side flow down and collide with the sheet of the heavy liquid generated in the heavy liquid openings 52 of the lower stage by one stage to the lowest stage or collide with liquid drops broken up and generated therefrom, and then the liquid drops coalesce, disperse or break up. The larger the number and/or area of the heavy liquid openings 52 which open in the respective cells 22, 32 is/are, the higher frequency of coalescence and breakup of the liquid drops is. In a process that the liquid drops are generated, an area of a liquid-liquid interface between the heavy liquid and the surrounding light liquid becomes quite large and the liquid drops after generation repeat coalescence, dispersion and breakup, mass transfer progresses, and extraction of a specific material can be performed effectively, for example. Further, the numerous generated liquid drops are alike in size and drop diameter and so minute liquid drops are hard to be generated, so that flooding is hard to occur, for example. It should be noted that it is a matter of course that variations explained using FIG. 8 to FIG. 11 can be also applied to the liquid-liquid contactor 1a.

On the other hand, in an extraction system having a large interfacial tension or an extraction system whose heavy liquid and light liquid have high viscosity, a diameter of a liquid drop generated may be sometimes large to some extent and extraction may not be performed effectively. Thus, as shown in FIG. 21, a pulsation generator 19 is connected to a lower still-standing section being a column bottom section of an extraction column 1d, for example, made of the liquid-liquid contactor 1a according to the present embodiment or a pulsation generated by sending an air pulse is combinedly used, whereby generated liquid drop is made small and extraction can be performed more effectively. It should be noted that in FIG. 21a reference numeral 11a indicates a heavy liquid feed section, a reference numeral 12a indicates a heavy liquid discharging section, a reference numeral 13a indicates a light liquid feed section and a reference numeral 14a indicates a light liquid discharging section.

Figure 22:
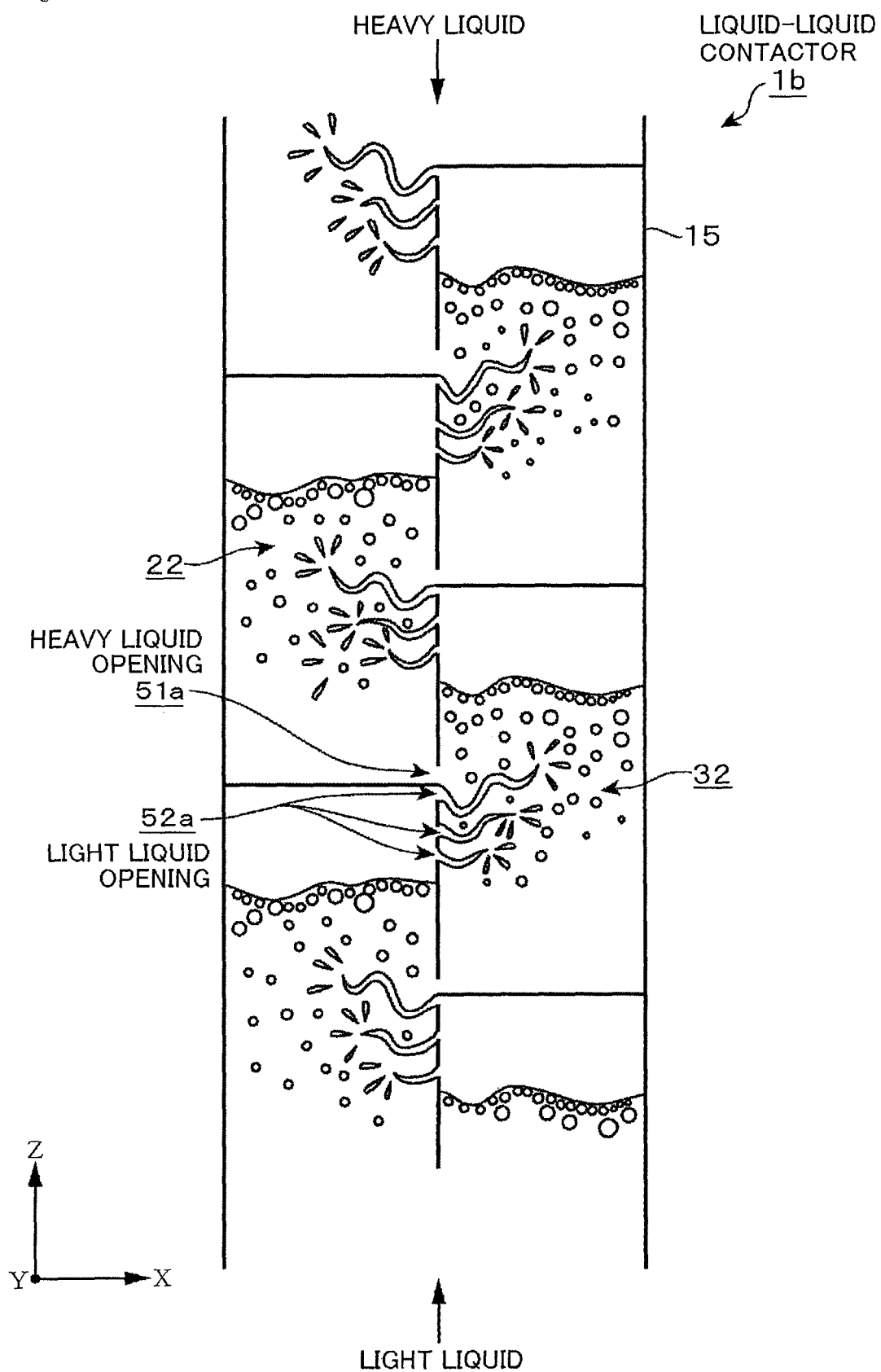
FIG. 22 is a longitudinal cross-sectional view showing a modification example of the second embodiment described above.

On the other hand, in a case that a light liquid is a disperse phase and a heavy liquid is a continuous phase, there is a difference from the liquid-liquid contactor 1a explained in FIG. 22 in that the cell 32 shown in FIG. 4 is made upside down, the reference numeral 51 in FIG. 4 is equivalent to a heavy liquid opening (indicated as a heavy liquid opening 51a), and the reference numeral 52 is equivalent to a light liquid opening (indicated as a light liquid opening 52a), as in a liquid-liquid contactor 1b shown in FIG. 20.

In the liquid-liquid contactor 1b, a light liquid residing in cells 22, 32 of lower stage sides are injected in a shape of sheet by its buoyancy into cells 22, 32 of upper stage sides via the light liquid opening (injection hole) 52a provided in a slit shape. On the other hand, from the cells 22, 32 of the upper stage sides, a heavy liquid flows into the cells 22, 32 of the lower stage sides in sheet-like flow while flowing down by a potential energy through a slit-like heavy liquid opening 51a provided immediately above the light liquid opening 52a.

As a result, when the light liquid injecting in the shape of sheet through a light liquid openings 52a rushes into a region into which the heavy liquid flows in a shape of sheet in a state that a flow speed is maximum from the heavy liquid opening 51a provided in an upper side of a neighborhood of the light liquid opening 52a, sheet-like flow of the light liquid is deformed and amplified to be a corrugated plate shape as shown in FIG. 22, a liquid-liquid interface is made large and the sheet-like flow of the light liquid is finally divided to be numerous liquid drops. Further, the liquid drops generated in the light liquid opening 52a of a lower side among the light liquid openings 52a sequentially provided in a longitudinal direction flow up and collide with the sheet of the light liquid generated in the light liquid openings 52a of the higher stage by one stage to the highest stage or collide with liquid drops broken up and generated from the sheet of the light liquid, and then the liquid drops coalesce, disperse or break up. The larger the number and/or area of the light liquid openings 52a which open in the respective cells 22, 32, the higher frequency of coalescence and breakup of the liquid drops. As a result, similarly to in the aforementioned liquid-liquid contactor 1a explained using FIG. 20, an area of a liquid-liquid interface between the heavy liquid and the surrounding light liquid becomes quite large and the liquid drops after generation repeat coalescence, dispersion and breakup, and so mass transfer progresses, and not only effective extraction is possible but also the numerous generated liquid drops are alike in size and drop diameter and minute liquid drops are hard to be generated, so that flooding is hard to occur, for example. It should be noted that also in the liquid-liquid contactor 1b it is possible to slope horizontal walls 21, 31, for example, to be higher toward the light liquid opening 52a to ease discharging of the light liquid, and it is also possible to make the cells 22, 32 of the upper stage sides and the cells 22, 32 of the lower stage sides stacked above and below each other and to provide light liquid openings 52a also in the horizontal walls 21, 31 of a ceiling surface side. On the other hand, in an extraction system having a large interfacial tension or an extraction system whose heavy liquid and light liquid have high viscosity, a diameter of a liquid drop generated may be sometimes large to some extent and extraction may not be performed effectively. Thus, similarly to in the example of aforementioned FIG. 22, a pulsation generator 19, for example, is connected to a lower still-standing section being a column bottom section of an extraction column made of the liquid-liquid contactor 1b according to the present embodiment, for example, or a pulsation generated by sending an air pulse is combinedly used, whereby the generated liquid drop is made smaller and extraction can be performed more effectively.

Figure 27:
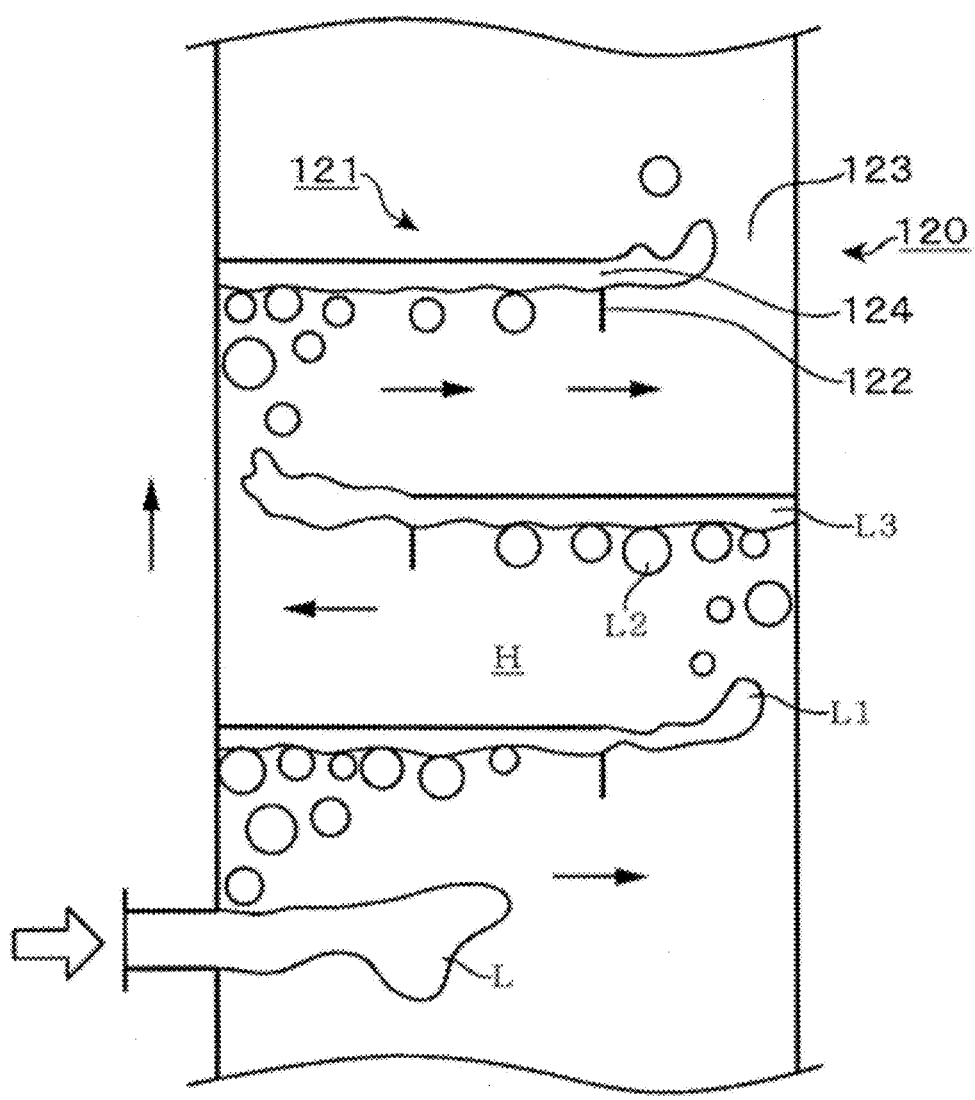
FIG. 27 is an explanatory view related to a conventional technology of a liquid-liquid contactor.

As described above, in the second embodiment shown in FIG. 20 and FIG. 22, it is possible to make the heavy liquid (or the light liquid) being the disperse phase and the light liquid (or the heavy liquid) being the continuous phase, which inject in sheet shapes, intersect with each other vigorously, compared with a liquid-liquid contactor 120 described in Background Technology using FIG. 27, and thus it is possible to increase the liquid-liquid interfacial area at a generation time of the liquid drop, to increase the frequency of coalescence and breakup of the liquid drops after generation, and to increase a mass transfer rate, so that extraction efficiency can be enhanced. Further, since the heavy liquid (or the light liquid) is injected in the shape of sheet unlike in the conventional injection of a liquid pillar shape, the size of the generated liquid drop and the drop diameter become more uniform and generation of a minute liquid drop can be restrained, so that a flooding velocity, for example, can be improved.

Hereinabove, in the contactors 1, 1a described in the first and second embodiments, there is exemplified one in which the inside of the cylindrical column is divided by partition walls constituted with the vertical wall 10 and the horizontal walls 21, 31, 41 to form a plurality of cells 22, 32, 42, but the contactor included in the present invention is not limited to the one in which neighboring cells 22, 32, 42 share the partition wall as in the above examples. For example, the present invention includes a contactor in which cells 22, 32, 42 having cubic shapes are individually created and liquid flow openings 52 and gas flow openings 51 of the neighboring cells 22, 32, 42 are connected to each other by pipes respectively to be on different stages.

WORKING EXAMPLE

Experiment 1

A gas-liquid contactor having almost the same constitution of the contactor shown in FIG. 8A and FIG. 8B was manufactured and a state of gas-liquid contacting was checked.

A. Experimental Method

As a main body of the gas-liquid contactor 1, there is used a transparent cylindrical pipe made of polyvinyl chloride which has a column diameter of 210 mm and a height of 1200 mm, and cells 22, 32, 42 are formed using partition walls (a vertical wall 10, horizontal walls 21, 31) made of stainless steel (SUS304). Heights of the respective cells 22, 32, 42 are 200 mm and the inside of the cylindrical pipe is divided so that three cell lines of five stacked stages are arranged in a lateral direction. Side surfaces of the respective cells 22, 32, 42 have almost the same constitution as that shown in FIG. 3B, a height in a longitudinal direction of a slit of a liquid flow opening 52 being 3 mm and a height in the longitudinal direction of a slit of a gas flow opening 51 being 10 mm.

To the above-described gas-liquid contactor 1, water is fed from a liquid feed section 11 and air is fed from a gas feed section 13, and then, the water and the air are subjected to countercurrent contacting.

Working Example 1

Air is fed at a superficial velocity of 0.5 m/s and a superficial velocity of water is varied to be 0.5 cm/s, 1.0 cm/s and 1.5 cm/s.

Working Example 2

With a superficial velocity of air being 1.0 m/s, a superficial velocity of water is varied under the same condition as in Working Example 1.

Working Example 3

With a superficial velocity of air being 1.5 m/s, a superficial velocity of water is varied under the same condition as in Working Example 1.

Working Example 4

With a superficial velocity of air being 1.0 m/s, a low concentration (0.5 wt %) ethanol aqueous solution being a sparkling aqueous solution is fed instead of water and a superficial velocity is varied to be 0.5 cm/s, 1.0 cm/s and 1.5 cm/s.

Working Example 5

With a superficial velocity of air being 1.0 m/s, a minute amount of surface active agent TRITON X-100 is mixed into water (5 mg/L) to use a sparkling aqueous solution instead of water and a superficial velocity is varied to be 0.5 cm/s, 1.0 cm/s and 1.5 cm/s.

B. Experimental Results

According to visual observation results of a gas-liquid state, it is confirmed that under any condition of (Working Example 1) to (Working Example 3), water becomes liquid drops and dispersed in the respective cells 22, 32 and is thereafter separated from a gas phase to form a liquid pool in a residence section 53. It is also confirmed that no foaming occurs in (Working Example 4) and (Working Example 5). When a gas is dispersed into a low concentration ethanol aqueous solution or a minute amount of aqueous solution including a small amount of surface active agent, a foam layer is generated in an upper section of the liquid, and foaming occurs in gas-liquid contacting in a tray column, causing a problem of reduced processing capability. However, when the liquid drops are dispersed into the gas as in the present example, foaming can be evaded and no foaming layer is generated, so that an effect can be obtained that reduction of processing capability by foaming is prevented.

Experiment 2

Figure 23:
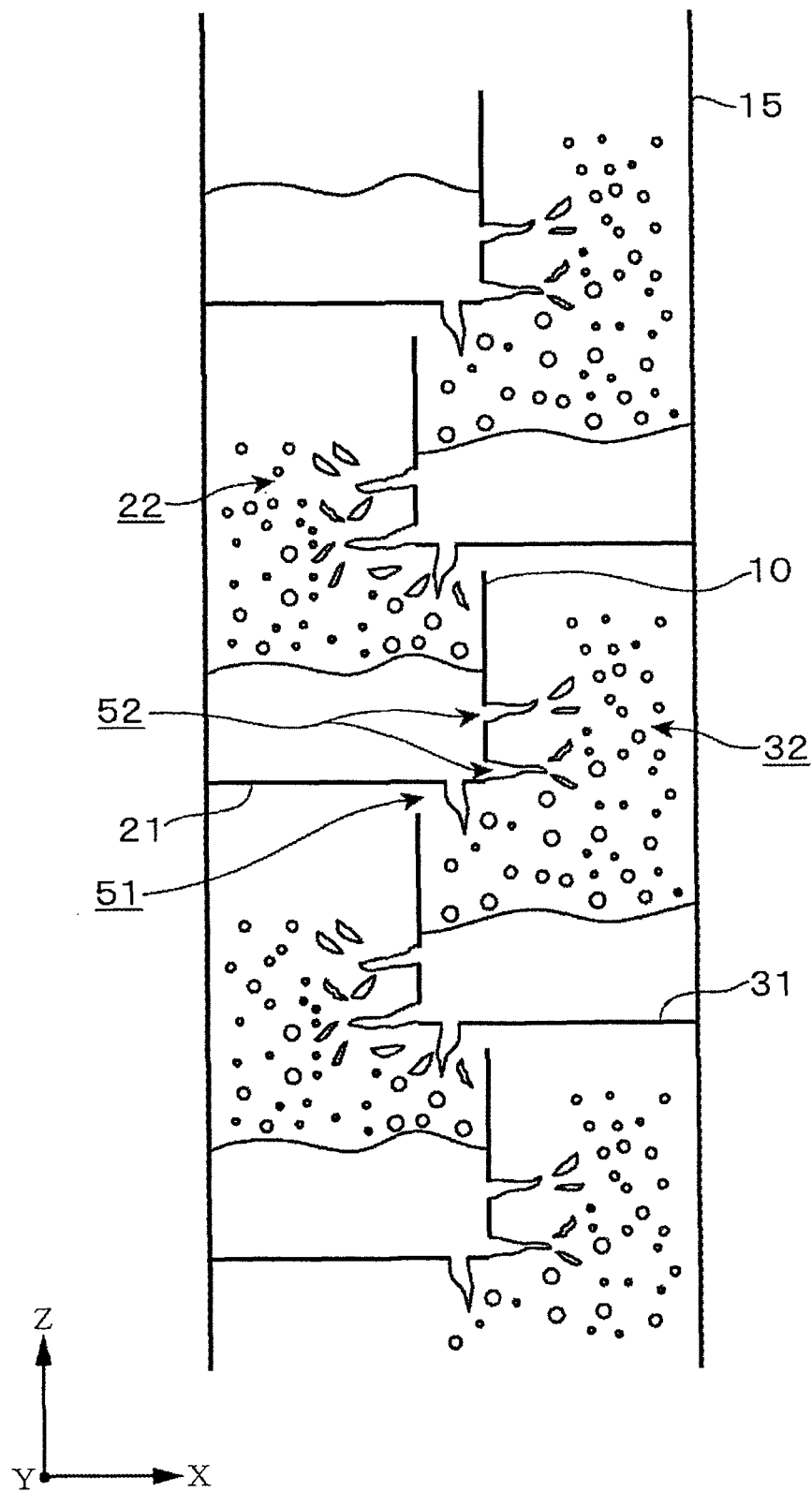
FIG. 23 is a longitudinal cross-sectional view showing a constitution of a distillation column used in an experiment in a working example.

Similarly to in the constitution shown in FIG. 9, liquid flow openings 52 are provided in a vertical wall 10 and horizontal walls 21, 31 and a gas flow opening 51 is provided at a position immediately below the liquid flow opening 52 of the vertical wall 10 side, and cells 22, 32 of two lines were manufactured (FIG. 23) to be incorporated into an existing distillation column to perform a distillation test and a stripping test.

A. Experimental Method

The distillation column has a column inside diameter of 198 mm and a height of 3300 mm, and cells 22, 32 in two lines-seven stages (fourteen stages in total) are installed. The respective cells 22, 32 have a height of 400 mm, the gas flow opening 51 has a width of 20 mm, and the liquid flow openings 52 are two lines of 3 mm wide slits in the horizontal wall and three lines of 3 mm wide slits in the vertical wall. The distillation column has a reboiler 62 in a column bottom section and a condenser 61 in a column top section.

First, the distillation test is performed under a total reflux condition, using a mixed solution of ethylbenzene and chlorobenzene.

Next, a mixture of ethylbenzene and chlorobenzene are fed to a column top of the distillation column, with feed rate and temperature of the reboiler 62 being changed, the stripping test is performed without reflux. In both experiments, vapor from the column top is introduced to the condenser 61 to keep a pressure at an atmospheric pressure.

Working Example 6

After a mixed solution of ethylbenzene and chlorobenzene (a weight fraction of ethylbenzene is 0.50 and a weight fraction of chlorobenzene is 0.50) is prepared in a column bottom of the distillation column, part thereof is sent to the reboiler 62, and with a reboiler outlet liquid being returned to the column bottom, a temperature of a column bottom liquid is raised to a predetermined temperature. Vapor flowing out of the column top is introduced to the condenser 61, and after being cooled and liquefied, all the distillate liquid is flew back to the column top. The pressure of the condenser 61 is kept at the atmospheric pressure, and after respective liquid temperatures at a reboiler outlet, the column bottom and the column top, and flow rate of reflux become constant, samples are taken from column top liquid and column bottom liquid and analyzed by a gas chromatogram. Measured results of the column top liquid and the column bottom liquid when reaching a steady state is shown in Table 1.

Working Example 7

A mixed solution of ethylbenzene and chlorobenzene (a mole fraction of ethylbenzene is 0.379 and a mole fraction of chlorobenzene is 0.621) is continuously fed to a column top of a stripping column and the all amount of a distillate liquid is discharged from the column top and a bottom liquid is discharged from the column bottom. After reaching a steady state, samples are taken from a column top liquid and a column bottom liquid and analyzed by a gas chromatogram. A measured result is shown in Table 2.

Working Example 8

An amount of material (a mole fraction of ethylbenzene is 0.426 and a mole fraction of chlorobenzene is 0.574) fed to the stripping column is increased from that of Working Example 7 by about 17% and an operation is performed by the same method to take data. A measured result is shown in Table 2.

TABLE 1

| Measurement item, Operation results | | | Working example 6 |
|---|---|---|---|
| Mass flow rate | Reflux | kg/h | 261 |
| Temperature | Reflux inlet | ° C. | 99.7 |

TABLE 1-continued

| Measurement item, Operation results | | | Working example 6 |
|---|---|---|---|
| | Column top | ° C. | 133.0 |
| | Column bottom | ° C. | 136.5 |
| | Reboiler outlet | ° C. | 137.4 |
| Composition | Column top | | |
| | Chlorobenzene | mol fr. | 0.655 |
| | Ethylbenzene | mol fr. | 0.345 |
| | Column bottom | | |
| | Chlorobenzene | mol fr. | 0.456 |
| | Ethylbenzene | mol fr. | 0.544 |
| Theoretical stage number | | — | 6.9 |
| Overall cell efficiency | | % | 49 |

TABLE 2

| Measurement item, Operation results | | | Working example 7 | Working example 8 |
|---|---|---|---|---|
| Mass flow rate | Reflux | kg/h | 0 | 0 |
| | Feed | kg/h | 260 | 305 |
| | Distillate | kg/h | 253 | 238 |
| | Bottoms | kg/h | 7 | 67 |
| Temperature | Feed inlet | ° C. | 100.9 | 99.7 |
| | Column top | ° C. | 133.2 | 133.4 |
| | Column bottom | ° C. | 135.6 | 136.0 |
| | Reboiler outlet | ° C. | 136.4 | 136.6 |
| Composition | Feed | | | |
| | Chlorobenzene | mol fr. | 0.621 | 0.574 |
| | Ethylbenzene | mol fr. | 0.379 | 0.426 |
| | Column top | | | |
| | Chlorobenzene | mol fr. | 0.627 | 0.599 |
| | Ethylbenzene | mol fr. | 0.373 | 0.401 |
| | Column bottom | | | |
| | Chlorobenzene | mol fr. | 0.440 | 0.489 |
| | Ethylbenzene | mol fr. | 0.560 | 0.511 |
| Theoretical stage number | | — | 7 | 9 |
| Overall cell efficiency | | % | 50 | 64 |

B. Experimental Results

According to experimental results shown in (Table 1), in the total reflux distillation test in (Working Example 6), since a concentration of low-boiling chlorobenzene (132° C.) is high at the column top section and a concentration of high-boiling ethylbenzene (136.22° C.) is high at the column bottom section, compared with in a composition at a preparation time, it is found that fractional distillation of both components are performed in the distillation column. When an outlet temperature of the reboiler 62 is 137.4° C. and a reflux amount from the condenser 61 is 261 kg/h, a theoretical stage number calculated based on the respective measured compositions of the column top and column bottom (mole fraction (mol fr.)) is 6.9 stages and overall cell efficiency is 49%.

Further, according to experimental results shown in (Table 2), in both of (Working Example 7) and (Working Example 8), a concentration of low-boiling chlorobenzene in a distillate from the column top is high and a concentration of high-boiling ethylbenzene is high in a discharged liquid from the column bottom in relation to a feed composition of the mixed solution, and it is found that stripping of a light component is performed in the distillation column.

In a stripping test of (Working Example 7), when the outlet temperature of the reboiler 62 is kept at 136.4° C. and feed rate charged to the stripping column is set at 260 kg/h, a distillate amount is 253 kg/h and an amount of bottoms is 7 kg/h, and overall cell efficiency is 50%. In a stripping test of (Working Example 8) in which a throughput is further increased, when an outlet temperature of the reboiler 62 is kept at 136.6° C. and feed rate charged to the stripping column is set at 305 kg/h, a distillate amount is 238 kg/h and an amount of bottoms is 67 kg/h, and overall cell efficiency is 64%. When a throughput is raised and amounts of liquid residence in respective cells are increased, contact efficiency is enhanced.

Experiment 3

In the following comparative example and working example, there is performed a liquid-liquid extraction operation extracting acetic acid from an acetic to acid aqueous solution (hereinafter, referred to as a material) having a concentration of 29 wt % in each case by a mixed solvent (hereinafter, referred to as a solvent) of ethyl acetate 80 vol %+cyclohexane 20 vol %.

Comparative Example 1

Figure 24:
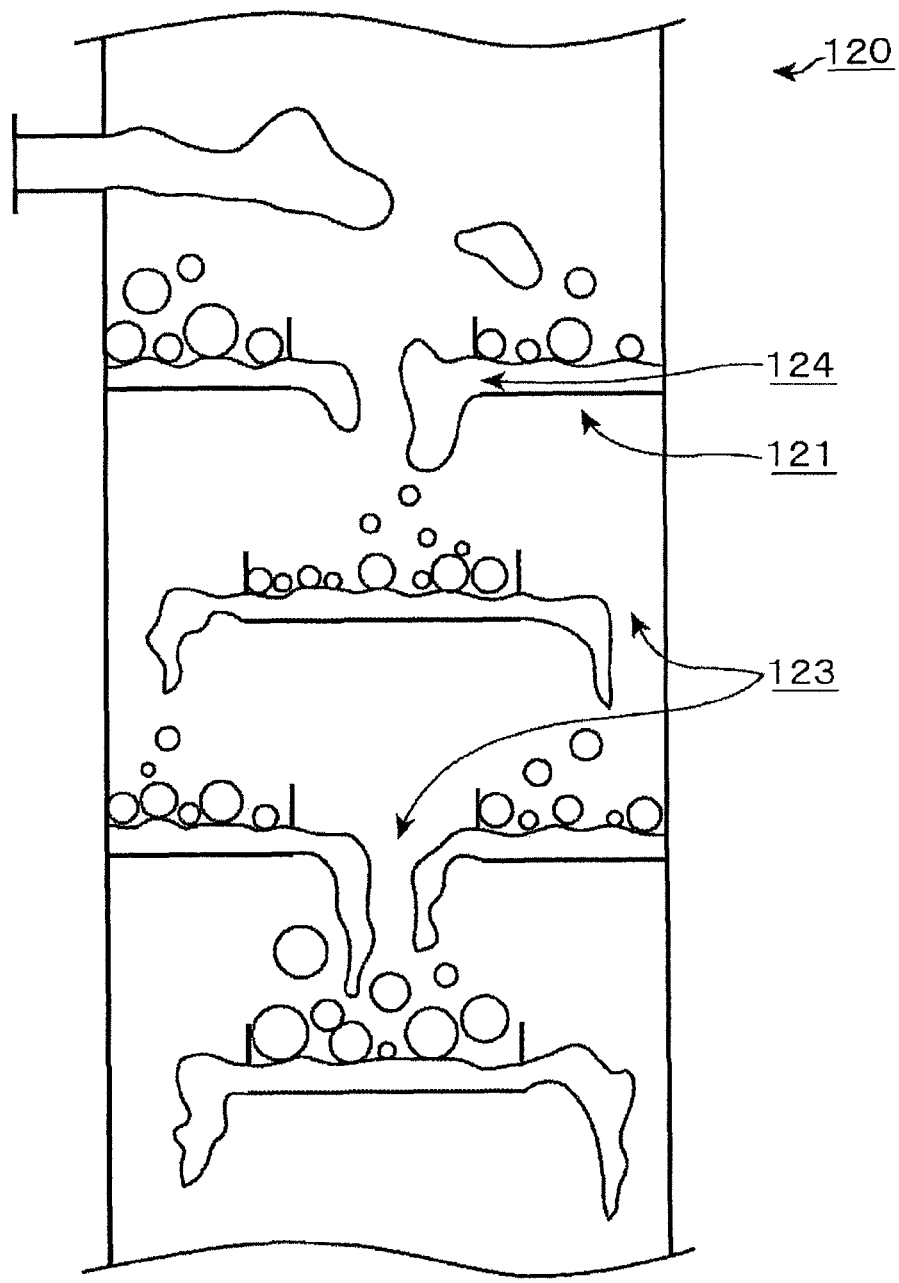
FIG. 24 is a longitudinal cross-sectional view showing a constitution of a liquid-liquid extraction column used in a comparative example experiment in another working example.

As an extracting apparatus, a weir plate type liquid-liquid extraction column 120 (Patent Document 3) having a structure shown in FIG. 24 is used. The liquid-liquid extraction column 120 has an inside diameter of 208 mm, and with a liquid flow path 123 opening area ratio (liquid flow path area/column cross-sectional area) of a tray 121 being 32%, there are disposed 25 stages of weir plate type trays 121 having four opening 124 of 25 mm×20 mm rectangles as a dispersed phase liquid flow path, at a tray interval of 100 mm.

Feed is heavy liquid and solvent is light liquid, and with the heavy liquid being dispersed phase and solvent ratio (weight ratio of solvent/feed) being selected to be 2/1, liquid-liquid countercurrent contacting is performed at a temperature of about 20° C. under an atmospheric pressure.

When feed rate charged is 218 kg/h and solvent (acetic acid concentration 0%) is 436 kg/h, raffinate has flow rate of 131 kg/h and an acetic acid concentration of 2.3 wt %. A liquid-liquid equilibrium calculation is performed to obtain a height equivalent to a theoretical stage (hereinafter referred to as "HETS"), and HETS is 0.64 m.

When feed and solvent are increased and at 335 kg/h for feed and 670 kg/h for solvent, a flooding occurs.

Working Example 9

Figure 25:
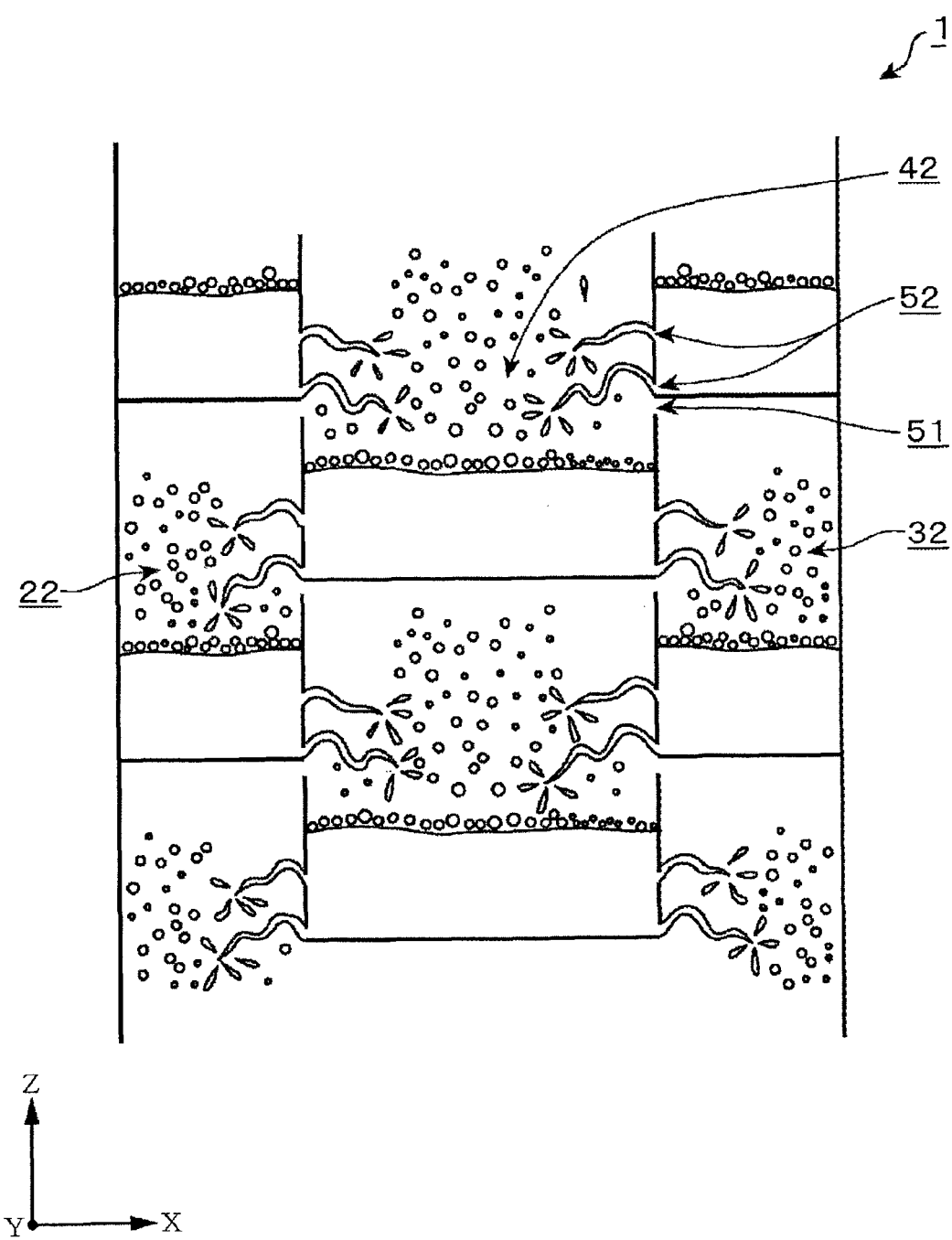
FIG. 25 is a longitudinal cross-sectional view showing a constitution of the liquid-liquid extraction column used in the experiment in another working example described above.
Figure 26A:
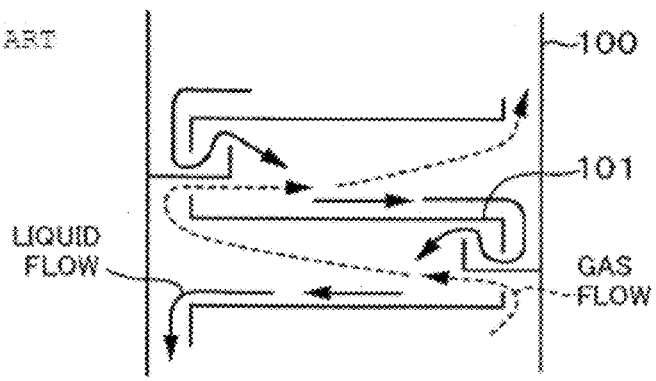
FIG. 26A to FIG. 26C are explanatory views related to a conventional technology of a gas-liquid contactor.
Figure 26B:
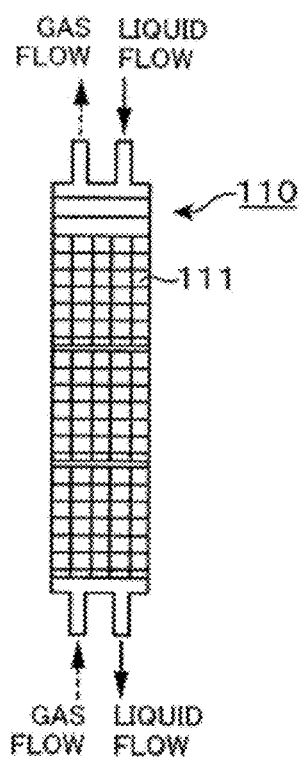
Figure 26C:
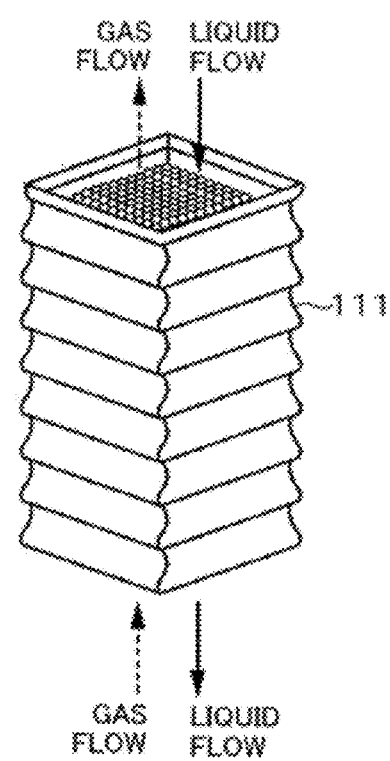

An experiment is performed using a cell type extracting apparatus (a liquid-liquid contactor 1c) according to an embodiment of the present invention which has a structure shown in FIG. 25 as an extracting apparatus. Cells 22, 32, 42 of three lines-twelve trays are disposed in the column having an inside diameter of 208 mm, and a height of the respective cells 22, 32, 42 is 200 mm, slits of a heavy liquid opening 52 have a width of 5 mm and arranged in two lines, and a width of a light liquid opening 51 is 20 mm. Conditions except feed and solvent rates are the same as in the comparative example 1.

When feed is 218 kg/h and solvent (acetic acid concentration 0%) is 436 kg/h, raffinate has flow rate of 132 kg/h and acetic acid concentration of 1.5 wt %. A liquid-liquid equilibrium calculation is performed to obtain HETS, and HETS is 0.54 m.

When feed is 335 kg/h and solvent (acetic acid concentration 0%) is 670 kg/h, raffinate has flow rate of 205 kg/h and acetic acid concentration of 1.2 wt %. A liquid-liquid equilibrium calculation is performed to obtain a height equivalent to a theoretical stage (hereinafter, referred to as "HETS"), and HETS is 0.49 m.

When feed and solvent are increased and at 450 kg/h for feed and 900 kg/h for solvent, a flooding occurs.

Throughputs and extraction efficiency according to the comparative example 1 and the present invention are shown in Table 3.

TABLE 3

| Liquid amount | | Extraction efficiency | | | |
|---|---|---|---|---|---|
| | | Comparative example 1 | | Working example 9 | |
| Feed (kg/h) | Solvent | Acetic acid extracted (%) | HETS (m) | Acetic acid extracted (%) | HETS (m) |
| 218 | 436 | 95.2 | 0.64 | 96.9 | 0.54 |
| 335 | 670 | * | * | 97.5 | 0.49 |
| 450 | 900 | | | * | * |

* Flooding Occurs

According to experimental results shown in (Table 3), in a case that liquid amounts fed are under the same condition (218 kg/h for feed, 436 kg/h for solvent), when comparing results of extraction examinations of the weir plate type liquid-liquid extraction column 120 of (Comparative Example 1) and the cell type liquid-liquid extraction column 1c of (Working Example 9), a value of HETS in (Working Example 9) is smaller than that in (Comparative Example 1) by about 15.6%, and extraction efficiency is better. Further, with a liquid amount fed (335 kg/h for feed, 670 kg/h for the solvent) with which the flooding occurs in (Comparative Example 1), an extraction operation is possible without incurring flooding in (Working Example 9).

The invention claimed is:

1. A contactor in which an upflow fluid comprising a gas is fed from a lower part of the contactor and a downflow fluid comprising a liquid is fed from an upper part of the contactor so that the gas and the liquid are subjected to countercurrent contacting, the contactor comprising:
   a first line of cells aligned along flow paths of the upflow fluid and the downflow fluid;
   a second line of cells aligned along the flow paths, the first line and the second line being disposed next to each other in a manner that the cells of the first line and the cells of the second lines are on different levels so that a cell in a first line is in communication with a cell in the second line that is higher than the cell in the first line and is in communication with a cell in the second line that is lower than the cell in the second line, each of the cells forming a countercurrent contacting space of the upflow fluid and the downflow fluid;
   a partition wall provided between each of the cells of the first line and a corresponding cell of the second line;
   a downflow fluid injection hole formed in a lower part of the partition wall of an upper cell so that the downflow fluid blocked by the partition wall is injected from the upper cell into a lower cell that is in communication with the upper cell, the upper cell and the lower cell belonging in different lines of cells; and
   an upflow fluid flow-in port formed in an upper part of the partition wall that is disposed above a region in which the downflow fluid blocked by the partition wall resides, through the upflow fluid flow-in port the upflow fluid flowing from the lower cell into the upper cell,
   wherein the downflow fluid injection hole comprises a plurality of openings in the partition wall and stacked in a vertical direction or a plurality of openings extending vertically in the partition wall and stacked in a horizontal direction.

2. The contactor according to claim 1, wherein the downflow fluid injection hole is provided with a first shutter opening and closing in correspondence with an amount of the downflow fluid blocked by the partition wall, in order to prevent the upflow fluid from flowing into the upper cell via the downflow fluid injection hole from the lower cell.

3. The contactor according to claim 2, wherein the first shutter is provided in a flow-out side of the downflow fluid injection hole so as to be closed by being biased by a first biasing device and to be opened against a bias of the first biasing device by a pressure from the downflow fluid residing in the upper cell.

4. The contactor according to claim 2, wherein the downflow fluid injection hole is provided in a side wall of the cell, and the first shutter is configured to move up and down between a down position to close the downflow fluid injection hole and an up position to open the downflow fluid injection hole, the first shutter moving up from the down position by buoyancy of the downflow fluid residing in the upper cell.

5. The contactor according to claim 4, wherein the downflow fluid injection hole is also provided in a bottom wall of the cell and the first shutter is configured to close the downflow fluid injection hole of the bottom wall at the down position.

6. The contactor according to claim 4, wherein the first shutter has a buoyancy compensator protruding in a lateral direction toward the upper cell.

7. The contactor according to claim 1, wherein the upflow fluid flow-in port is provided with a second shutter opening and closing a part of the upflow fluid flow-in port in correspondence with a pressure of the upflow fluid flowing from the lower cell into the upper cell.

8. The contactor according to claim 7, wherein the second shutter is provided in a flow-out side of the upflow fluid flow-in port so as to be closed by being biased by a second biasing device and to be opened against a bias of the second biasing device by a pressure from the upflow fluid.

9. A contactor in which an upflow fluid comprising a liquid is fed from a lower part of the contactor and a downflow fluid comprising a liquid is fed from an upper part of the contactor so that the liquid and the liquid are subjected to countercurrent contacting, the contactor comprising:
   a first line of cells aligned along flow paths of the upflow fluid and the downflow fluid;
   a second line of cells aligned along the flow paths, the first line and the second line being disposed next to each other in a manner that the cells of the first line and the cells of the second lines are on different levels so that a cell in a first line is in communication with a cell in the second line that is higher than the cell in the first line and is in communication with a cell in the second line that is lower than the cell in the second line, each of the cells forming a countercurrent contacting space of the upflow fluid and the downflow fluid;
   a partition wall provided between each of the cells of the first line and a corresponding cell of the second line;
   a downflow fluid injection hole formed in a lower part of the partition wall of an upper cell so that the downflow fluid blocked by the partition wall and residing in the upper cell is injected by its potential energy into a lower cell that is in communication with the upper cell, the upper cell and the lower cell belonging in different lines of cells; and an upflow fluid flow-in port formed in the partition wall and disposed higher than the downflow fluid injection hole, through the upflow fluid flow-in port the upflow fluid flowing from the lower cell by its buoyancy into the upper cell, wherein the downflow fluid injection hole comprises a plurality of openings in the partition wall and stacked in a vertical direction or a plurality of openings extending vertically in the partition wall and stacked in a horizontal direction.

10. The contactor according to claim 1 or claim 9, wherein the upper cell and the lower cell are in a positional relationship in which parts thereof are stacked vertically, and the injection hole of the downflow fluid is provided in a lower side wall or a bottom wall of the upper cell.

11. The contactor according to claim 1 or claim 9, wherein the injection hole of the downflow fluid comprises a slit extending in a lateral direction or a longitudinal direction or hole sections numerously arranged in a lateral direction or a longitudinal direction.

12. The contactor according to claim 1 or claim 9, wherein the flow-in port of the upflow fluid comprises a slit extending in a lateral direction or a longitudinal direction or hole sections numerously arranged in the lateral direction or the longitudinal direction.

13. The contactor according to claim 1 or claim 9, wherein a bottom surface of the cell is sloped to be lower toward the injection hole of the cell.

14. A contactor in which an upflow fluid comprising a liquid is fed from a lower part of the contactor and a downflow fluid comprising a liquid is fed from an upper part of the contactor so that the liquid and the liquid are subjected to countercurrent contacting, the contactor comprising:

a first line of cells aligned along flow paths of the upflow fluid and the downflow fluid;

a second line of cells aligned along the flow paths, the first line and the second line being disposed next to each other in a manner that the cells of the first line and the cells of the second lines are on different levels so that a cell in a first line is in communication with a cell in the second line that is higher than the cell in the first line and is in communication with a cell in the second line that is lower than the cell in the second line, each of the cells forming a countercurrent contacting space of the upflow fluid and the downflow fluid;

a partition wall provided between each of the cells of the first line and a corresponding cell of the second line;

an upflow fluid injection hole formed in an upper part of the partition wall of a lower cell so that the upflow fluid residing in the lower cell is injected by its buoyancy into an upper cell that is in communication with the lower cell, the upper cell and the lower cell belonging in different lines of cells; and a downflow fluid flow-in port formed in the partition wall and disposed lower than the upflow fluid injection hole, the downflow fluid flowing from the upper cell by its potential energy into the lower cell through the downflow fluid flow-in port, wherein the upflow fluid injection hole comprises a plurality of openings in the partition wall and stacked in a vertical direction or a plurality of openings extending vertically in the partition wall and stacked in a horizontal direction.

15. The contactor according to claim 14, wherein the upper cell and the lower cell are in a positional relationship in which parts thereof are stacked vertically, and the injection hole of the upflow fluid is provided in an upper side wall or a ceiling wall of the upper cell.

16. The contactor according to claim 14, wherein the injection hole of the upflow fluid comprises a slit extending in a lateral direction or a longitudinal direction or hole sections numerously arranged in the lateral direction or the longitudinal direction.

17. The contactor according to claim 14, wherein the flow-in port of the downflow fluid comprises a slit extending in a lateral direction or a longitudinal direction or hole sections numerously arranged in the lateral direction or the longitudinal direction.

18. The contactor according to claim 1 or claim 9 or claim 14, further comprising a third line of cells aligned in the flow paths, the first, second and third lines being disposed next to each other in a manner that the cells of the third line are on different levels from the cells of the first line or the cells of the second line.

19. The contactor according to claim 18, wherein the respective cell lines are arranged laterally along one direction.

20. The contactor according to claim 18, wherein the contactor is formed to have a cylindrical shape and the respective cells are arranged concentrically laterally.

21. A contactor in which an upflow fluid comprising a gas is fed from a lower part of the contactor and a downflow fluid comprising a liquid is fed from an upper part of the contactor so that the gas and the liquid are subjected to countercurrent contacting, the contactor comprising:

a first line of cells aligned along flow paths of the upflow fluid and the downflow fluid;

a second line of cells aligned along the flow paths, the first line and the second line being disposed next to each other in a manner that the cells of the first line and the cells of the second lines are on different levels so that a cell in a first line is in communication with a cell in the second line that is higher than the cell in the first line and is in communication with a cell in the second line that is lower than the cell in the second line, each of the cells forming a countercurrent contacting space of the upflow fluid and the downflow fluid;

a partition wall provided between each of the cells of the first line and a corresponding cell of the second line;

a downflow fluid injection hole formed in a bottom wall of an upper cell so that the downflow fluid blocked by the partition wall is injected from the upper cell into a lower cell that is in communication with the upper cell, the upper cell and the lower cell belonging in different lines of cells; and an upflow fluid flow-in port formed in an upper part of the partition wall that is disposed above a region in which the downflow fluid blocked by the partition wall resides, through the upflow fluid flow-in port the upflow fluid flowing from the lower cell into the upper cell.

22. The contactor according to claim 21, wherein the downflow fluid injection hole comprises a first shutter configured to move up and down between a down position to close the downflow fluid injection hole and an up position to open the downflow fluid injection hole, the first shutter moving up from the down position by buoyancy of the downflow fluid residing in the upper cell.

* * * * *